United States Patent
Savikovsky et al.

(10) Patent No.: US 11,552,439 B2
(45) Date of Patent: Jan. 10, 2023

(54) LASER PROJECTOR

(71) Applicant: FARO Technologies, Inc., Lake Mary, FL (US)

(72) Inventors: Arkady Savikovsky, Burlington, MA (US); Joel H. Stave, New Boston, NH (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 199 days.

(21) Appl. No.: 17/028,398

(22) Filed: Sep. 22, 2020

(65) Prior Publication Data

US 2021/0126419 A1     Apr. 29, 2021

Related U.S. Application Data

(60) Provisional application No. 62/935,709, filed on Nov. 15, 2019, provisional application No. 62/925,257, filed on Oct. 24, 2019.

(51) Int. Cl.
*H04N 9/31* (2006.01)
*H01S 3/00* (2006.01)
*H01S 3/11* (2006.01)

(52) U.S. Cl.
CPC .......... *H01S 3/0071* (2013.01); *H01S 3/0014* (2013.01); *H01S 3/11* (2013.01); *H04N 9/3135* (2013.01)

(58) Field of Classification Search
CPC .... H01S 3/0014; H01S 3/0071; H04N 9/3135
See application file for complete search history.

(56) References Cited

U.S. PATENT DOCUMENTS

| | | | |
|---|---|---|---|
| 6,547,397 B1 * | 4/2003 | Kaufman | G01S 17/10 372/24 |
| 6,935,748 B2 | 8/2005 | Kaufman et al. | |
| 7,306,339 B2 | 12/2007 | Kaufman et al. | |
| 8,582,087 B2 | 11/2013 | Kaufman et al. | |
| 9,879,983 B2 | 1/2018 | Kaufman et al. | |
| 10,432,903 B2 | 10/2019 | Kaufman et al. | |
| 10,670,390 B2 | 6/2020 | Wilson et al. | |
| 10,884,257 B2 | 1/2021 | Savikovsky et al. | |
| 2008/0246943 A1 * | 10/2008 | Kaufman | G01N 21/9515 356/5.01 |
| 2015/0085108 A1 | 3/2015 | Kaufman et al. | |
| 2019/0064324 A1 | 2/2019 | Kaufman | |

(Continued)

FOREIGN PATENT DOCUMENTS

| | | |
|---|---|---|
| EP | 1277066 | 11/2001 |
| WO | 0182634 A2 | 11/2001 |

OTHER PUBLICATIONS

Unknown: "International Standard IEC 60825-1", Aug. 1, 2001 (Aug. 1, 2001), XP055714455, Retrieved from the Internet: URL:https://shop.textalk.se/shop/ws26/40626/files/full_size_for_start_page_banner/iec60825-1{ed1.2}en.pdf.

*Primary Examiner* — Michael Carter
(74) *Attorney, Agent, or Firm* — Cantor Colburn LLP

(57) ABSTRACT

A laser projector steers a pulsed laser beam to form a pattern of stationary dots on an object, the pulsed laser beam having a periodicity determined based at least in part on a maximum allowable spacing of the dots and on a maximum angular velocity at which the beam can be steered, wherein a pulse width of the laser beam and a pulse peak power of the laser beam are based at least in part on the determined periodicity and on laser safety requirements.

15 Claims, 26 Drawing Sheets

(56) References Cited

U.S. PATENT DOCUMENTS

| | | |
|---|---|---|
| 2019/0107607 A1 | 4/2019 | Danziger |
| 2019/0115710 A1* | 4/2019 | Miller .................... G01S 7/484 |
| 2019/0368939 A1* | 12/2019 | Vakhshoori ........... G01J 3/0224 |
| 2019/0391409 A1 | 12/2019 | Savikovsky et al. |

* cited by examiner

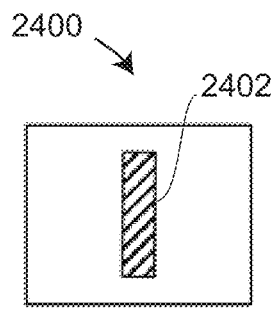
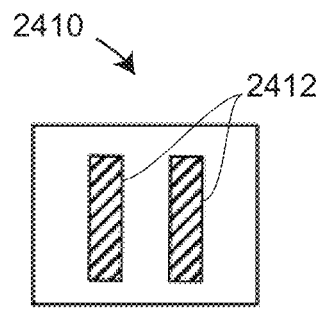
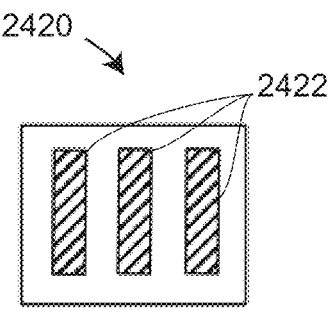
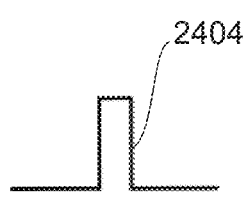
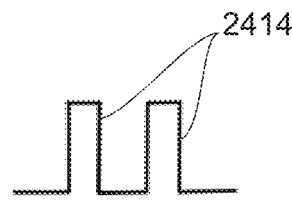
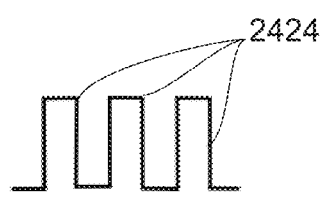
FIG. 24A  FIG. 24B  FIG. 24C
FIG. 24D
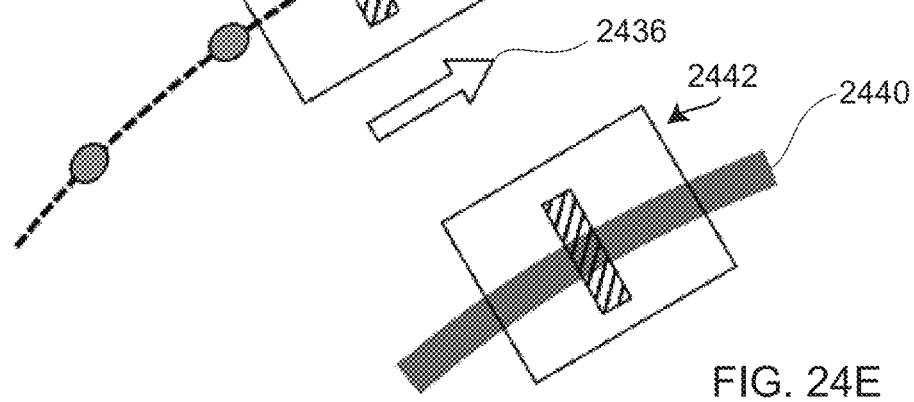
FIG. 24E

LASER PROJECTOR

CROSS REFERENCE TO RELATED APPLICATIONS

This application claims the benefit of U.S. Provisional Application Ser. No. 62/925,257 (filed Oct. 24, 2019) and U.S. Provisional Application Ser. No. 62/935,709 (filed Nov. 15, 2019), the contents of both of which are incorporated herein in their entirety.

BACKGROUND

The subject matter disclosed herein relates to a light projection system, often referred to as a "laser projector," and especially to a light projection system that projects a glowing light pattern onto an object without requiring retroreflective or cooperative targets.

Light projection devices are used in a variety of applications to project images onto objects. In some applications, an illuminated three-dimensional (3D) pattern, also referred to as a "template," is projected onto an object. The template may be formed, for example, by projecting a rapidly moving, vector-scan, light beam onto the object. In some systems, the projected light beam is a laser beam. The light beam strikes the surface of the object following a predetermined trajectory in a repetitive manner. When repetitively moved at a sufficiently high beam speed and refresh rate, the trace of the projected beam on the object appears to the human eye as a continuous glowing line. The projected pattern of light appears as the glowing template that can be used to assist in the positioning of parts, components and work pieces.

Currently, light projection systems are mainly used within production facilities. Light projection systems potentially useful outside production facilities, for example, in construction sites to assist in constructing of buildings or other objects. However, until now, limitations have made the use of light projection devices impractical in such applications. Examples of such limitations include (1) power limitations that make battery operation largely impractical, (2) cumbersome sharing of information with computers and accessory instruments, (3) relatively large instrument size, and (4) dynamic range limitations making many types of measurements impractical. In addition, a problem seen within production facilities and outdoors at construction sites is poor visibility of projected laser beams in certain circumstances, particularly when distances being measured are large, when flicker cannot be tolerated, and when laser safety standards are desired be observed.

Accordingly, while light projection systems and methods are suitable for their intended purposes, the need for improvement remains, particularly in enabling power efficient battery operation, methods of easily sharing data with computers and instruments, reducing instrument size, increasing measurement dynamic range, and maintaining high visibility of projected light.

BRIEF DESCRIPTION

According to an embodiment, a method is provided. The method includes: steering a pulsed laser beam to form a pattern of stationary dots on an object, the pulsed laser beam having a periodicity determined based at least in part on a maximum allowable spacing of the dots and on a maximum angular velocity at which the beam can be steered, wherein a pulse width of the laser beam and a pulse peak power of the laser beam are based at least in part on the determined periodicity and on laser safety requirements; and storing the periodicity.

In addition to one or more of the features described herein, or as an alternative, further embodiments of the method may include steering a continuous-wave (cw) laser beam to form a pattern on the object, the power of the emitted laser beam based at least in part on the laser safety requirements. In addition to one or more of the features described herein, or as an alternative, further embodiments of the method may include shutting off projection of laser light in response to detecting with an optical detector a condition indicating that the emitted laser pulse energy has exceeded a laser safety limit. In addition to one or more of the features described herein, or as an alternative, further embodiments of the method may include shutting off projection of laser light in response to detecting with an optical detector a condition indicating that the emitted average laser power has exceeded a laser safety limit.

In addition to one or more of the features described herein, or as an alternative, further embodiments of the method may include placing a reflective target to intercept one of the dots; and detecting a change in reflected light and, in response, switching the laser from pulsed mode to continuous-wave (cw) mode. In addition to one or more of the features described herein, or as an alternative, further embodiments of the method may include detecting a second pattern of laser light reflected from the reflective target when the laser is in cw mode and, in response, taking an action based on the detected second pattern.

According to another embodiment a device is provided. The device includes: a laser operable to produce a pulsed laser beam; a beam-steering system operable to steer the pulsed laser beam onto an object; and one or more processors operable to control the laser and the beam-steering system to form the pulsed laser beam into a pattern of stationary dots on the object, the pulsed laser beam having a periodicity determined based at least in part on a maximum allowable spacing of the dots and on a maximum angular velocity at which the beam can be steered, the pulsed laser beam having a pulse width and a pulse peak power of the laser beam determined based at least in part on the determined periodicity and on laser safety requirements.

In addition to one or more of the features described herein, or as an alternative, further embodiments of the device may include the laser being further operable to produce a continuous-wave (cw) laser beam having an emitted power, the emitted power based at least in part on the laser safety requirements; and the beam-steering system is further operable to steer the cw laser beam onto the object to form a pattern on the object. In addition to one or more of the features described herein, or as an alternative, further embodiments of the device may include the one or more processors are further operable to shut off the projection of laser light in response to detecting with an optical detector a condition indicating that the emitted laser pulse energy has exceeded a laser safety limit. In addition to one or more of the features described herein, or as an alternative, further embodiments of the device may include the one or more processors are further operable to shut off the projection of laser light in response to detecting with an optical detector a condition indicating that the emitted average laser power has exceeded a laser safety limit. In addition to one or more of the features described herein, or as an alternative, further embodiments of the device may include the action including steering the pulsed laser beam to form a third pattern of stationary dots on the object, the third pattern covering a smaller area than the first pattern.

In addition to one or more of the features described herein, or as an alternative, further embodiments of the device may include a reflective target; and an optical detector operable to detect reflected laser light. In addition to one or more of the features described herein, or as an alternative, further embodiments of the device may include the laser being further operable to produce a continuous-wave (cw) laser beam; the beam-steering system is further operable to steer the cw laser beam onto the object to form a pattern on the object; and the one or more processors are further operable to determine that laser light detected by the detector has been reflected by the reflective target and, in response, causing the laser to emit the cw laser beam and further causing the beam-steering system to steer the emitted cw laser beam into a segment of light on the reflective target.

In addition to one or more of the features described herein, or as an alternative, further embodiments of the device may include the one or more processors are further operable to determine that the cw laser beam, when reflected from the reflective target and detected by the optical detector, has a second pattern, the processor taking a further action based on the determined second pattern. In addition to one or more of the features described herein, or as an alternative, further embodiments of the device may include the further action including steering the pulsed laser beam to form a third pattern of stationary dots on the object, the third pattern covering a smaller area than the first pattern.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 24A, 24B, 24C are schematic illustrations of three different coded patch patterns according to an embodiment;

FIG. 24D is a schematic illustration of a patch in the vicinity of stationary projected light spots; and FIG. 24E is a schematic illustration of a patch in the vicinity of a cw projected light beam according to an embodiment.

The detailed description explains embodiments of the disclosure, together with advantages and features, by way of example with reference to the drawings.

DETAILED DESCRIPTION

Embodiments of the present disclosure provide improved power efficiency, built-in batteries, wireless communication, reduced instrument size, improved dynamic range, and higher visibility of projected patterns without flicker.

Figure 1A:
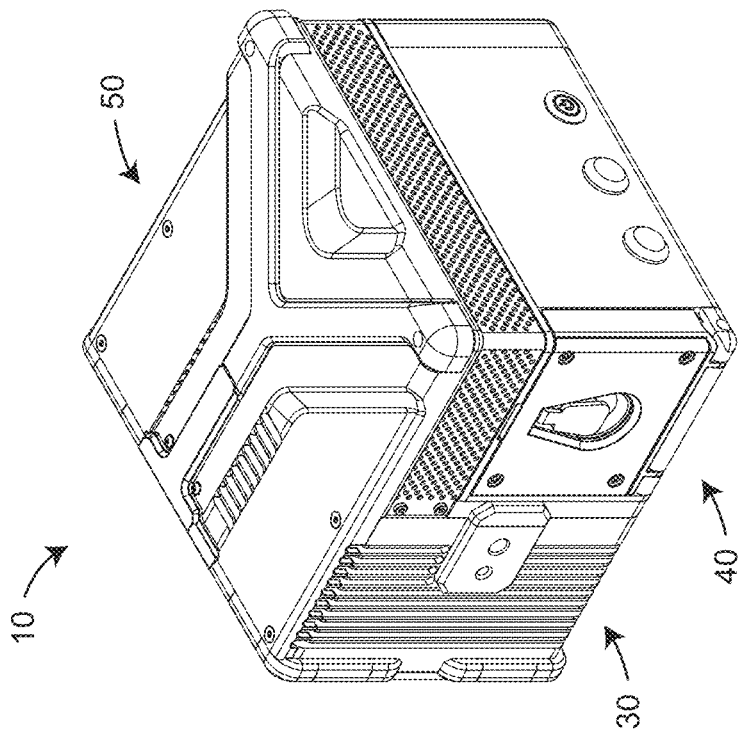
FIGS. 1A, 1B are two isometric views of a light projection system according to an embodiment.
Figure 1B:
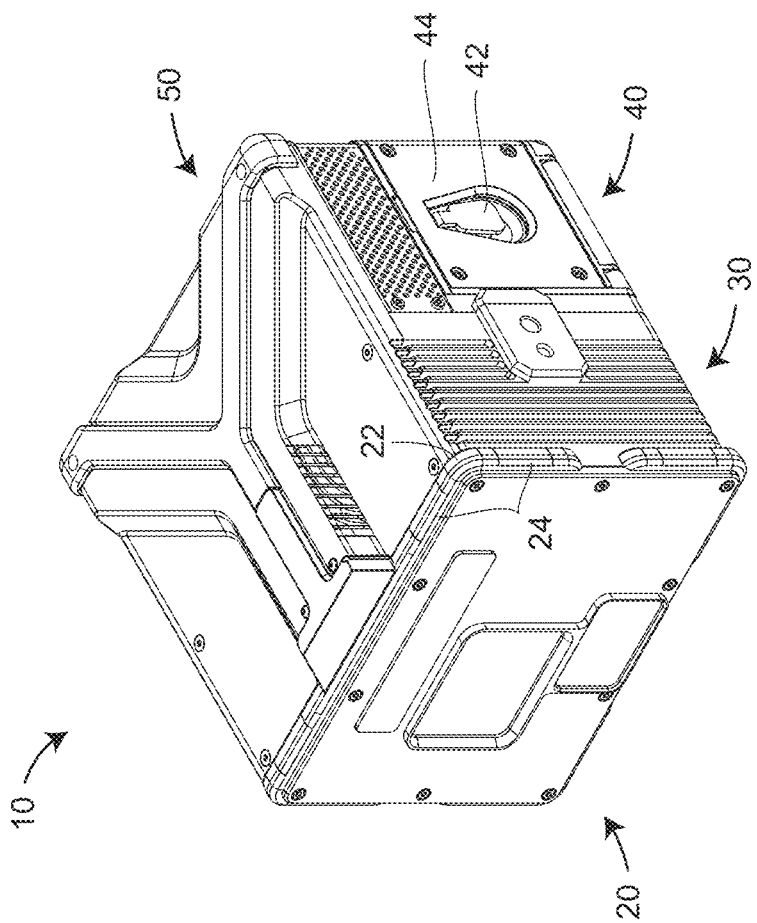

FIGS. 1A, 1B are front isometric and rear isometric views of a light projector 10 according to an embodiment. In an embodiment, the light projector 10 includes a front cover assembly 20, a base assembly 30, a power assembly 40, and a fan assembly 50. The power assembly 40 further includes a latch 42 that opens and closes a door 44. In an embodiment, elastomeric bumpers 22 are attached to each of the four corners of the front cover assembly 20 and light pipes 24 are attached on each side of each bumper. The light pipes are illuminated by light emitting diodes (LEDs) in status LED PCBAs 340 (FIG. 3).

Figure 2:
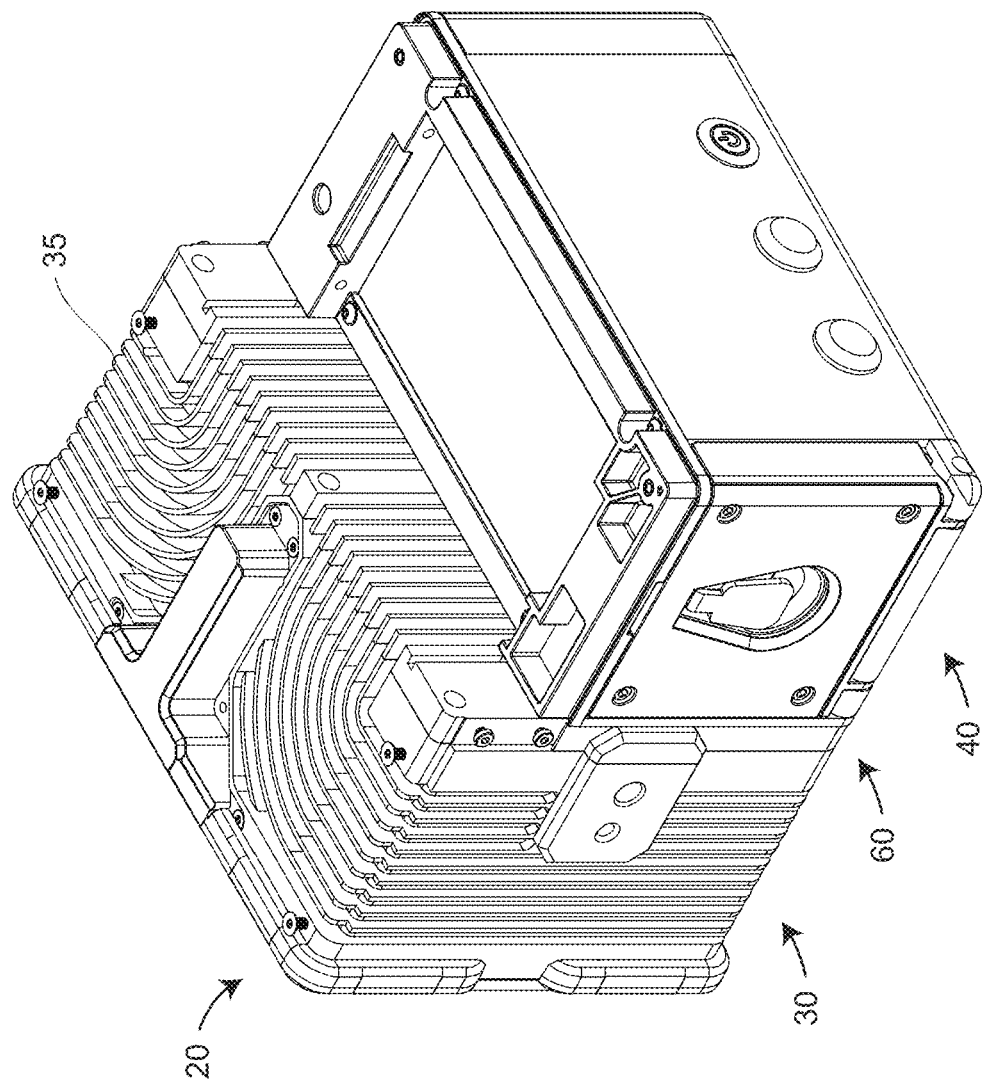
FIG. 2 is an isometric view of the light projection system with its fan cooling system removed according to an embodiment.

FIG. 2 is an isometric view of the light projector with the fan assembly removed. A rear assembly 60 is sandwiched between the base assembly 30 and the power assembly 40. The base assembly 30 and the rear assembly 60 include grooved heat sinks 35 as outer elements.

Figure 3:
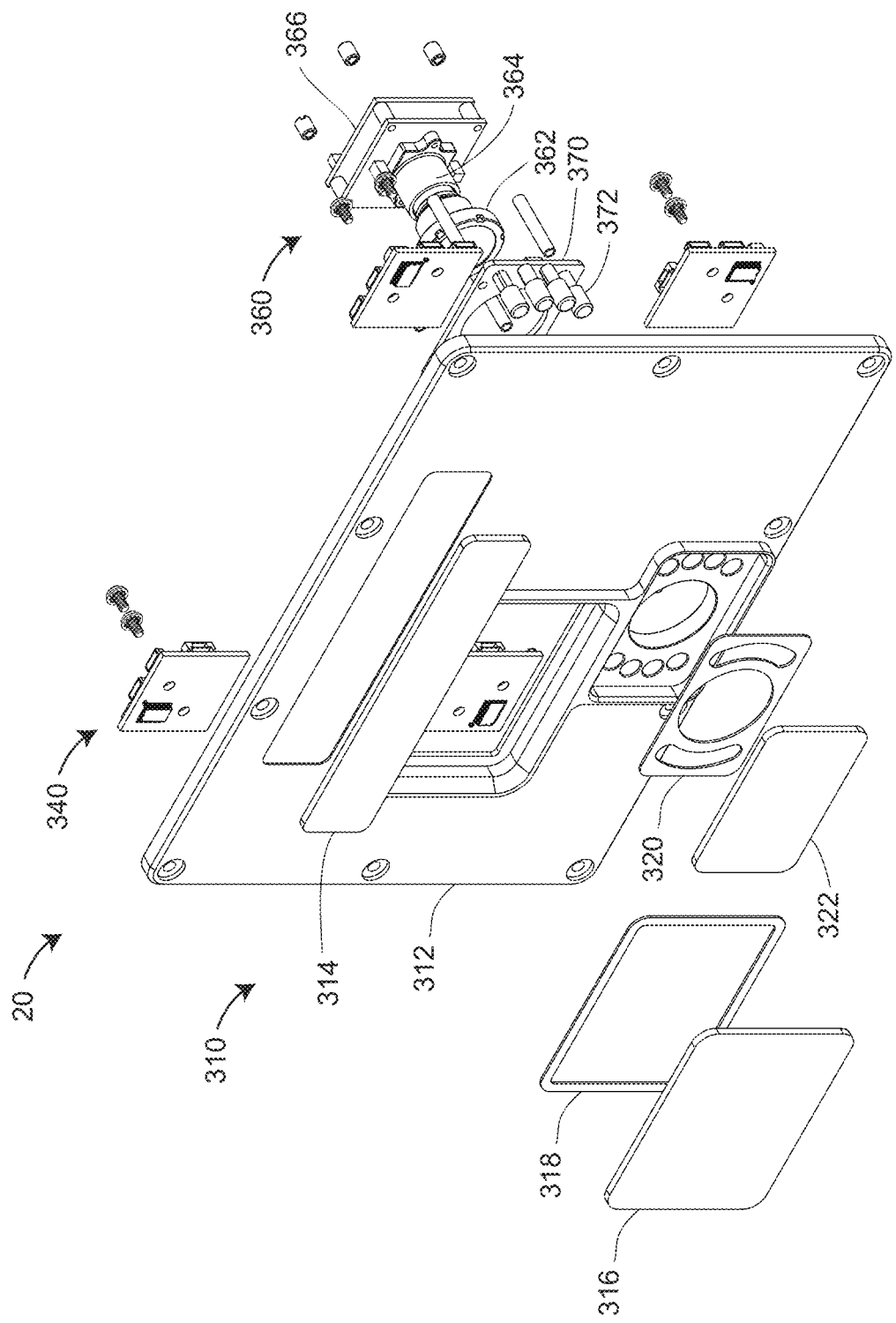
FIG. 3 is an exploded view of a front-panel assembly of a light projector according to an embodiment.

FIG. 3 is an exploded isometric view of the front cover assembly 20. In an embodiment, the front cover assembly 20 includes a front panel subassembly 310, status LED printed circuit board assemblies (PCBAs) 340, and camera subassembly 360. The front panel subassembly 310 includes a front panel form 312, an information plate 314, a front window 316, a window gasket 318, a camera illuminator gasket 320, and a camera window 322. The front cover assembly 20 includes four of the status LED PCBAs 340, one of the PCBAs 40 behind each corner of the front panel form 312. In an embodiment, the camera subassembly 360 includes a camera lens 362, a camera lens mount 364, a camera PCBA 366, and an infrared (IR) LED PCBA 370. The camera PCBA 366 includes a photosensitive array, and the IR LED PCBA 370, which includes LEDs 372.

Figure 4B:
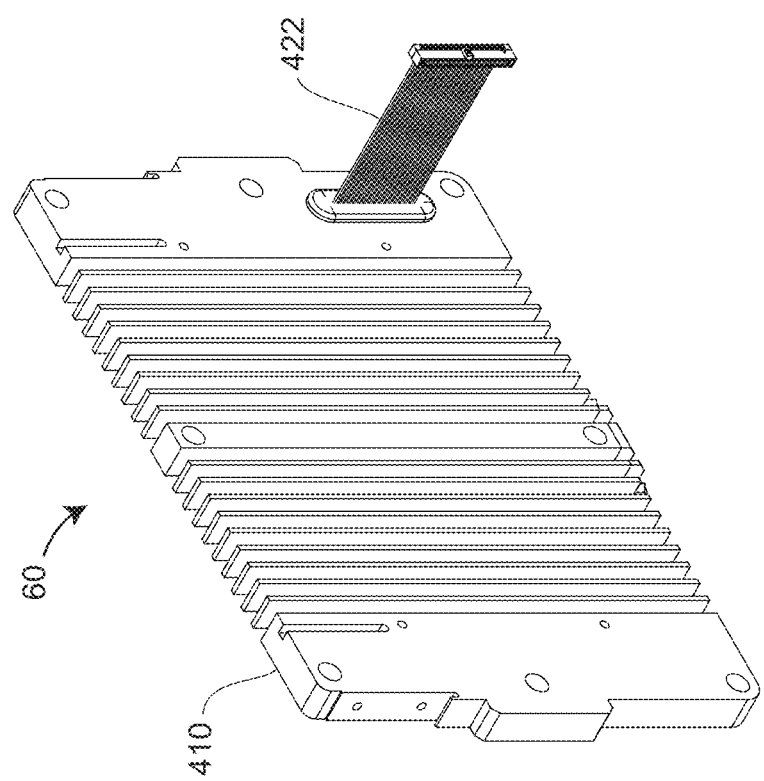
FIGS. 4A, 4B are front and rear isometric view of a rear panel assembly according to an embodiment.
Figure 4A:
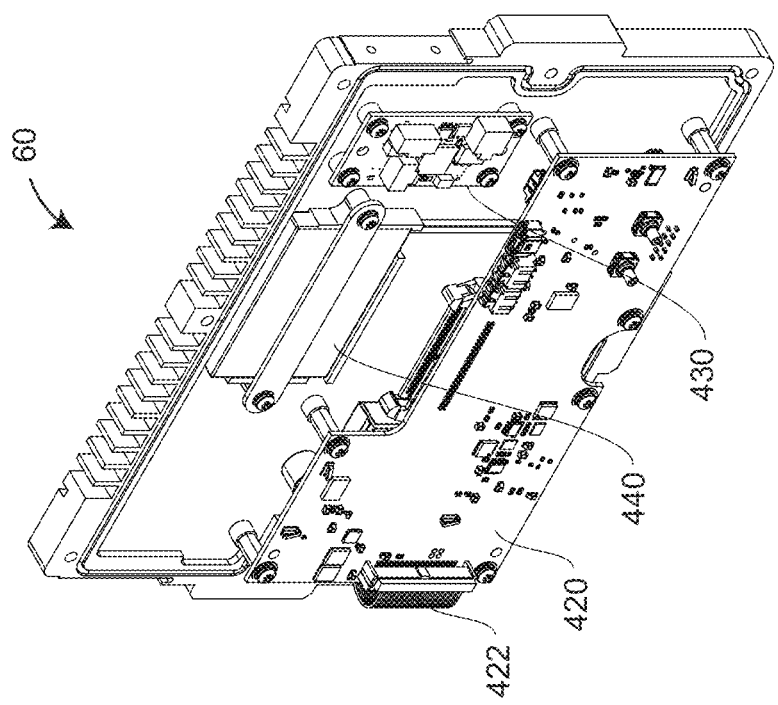

FIGS. 4A, 4B show two isometric views of the rear assembly 60. The rear assembly 60 includes a rear panel 410, a power distribution PCBA 420, a ribbon cable 422, an environmental recorder 430, and an internal battery 440. The ribbon cable, which has first header 423 and second header 424, receives electrical power from and exchanges communication signals with the power assembly 40. The rear panel 410 serves as a grooved heat sink.

Figure 5:
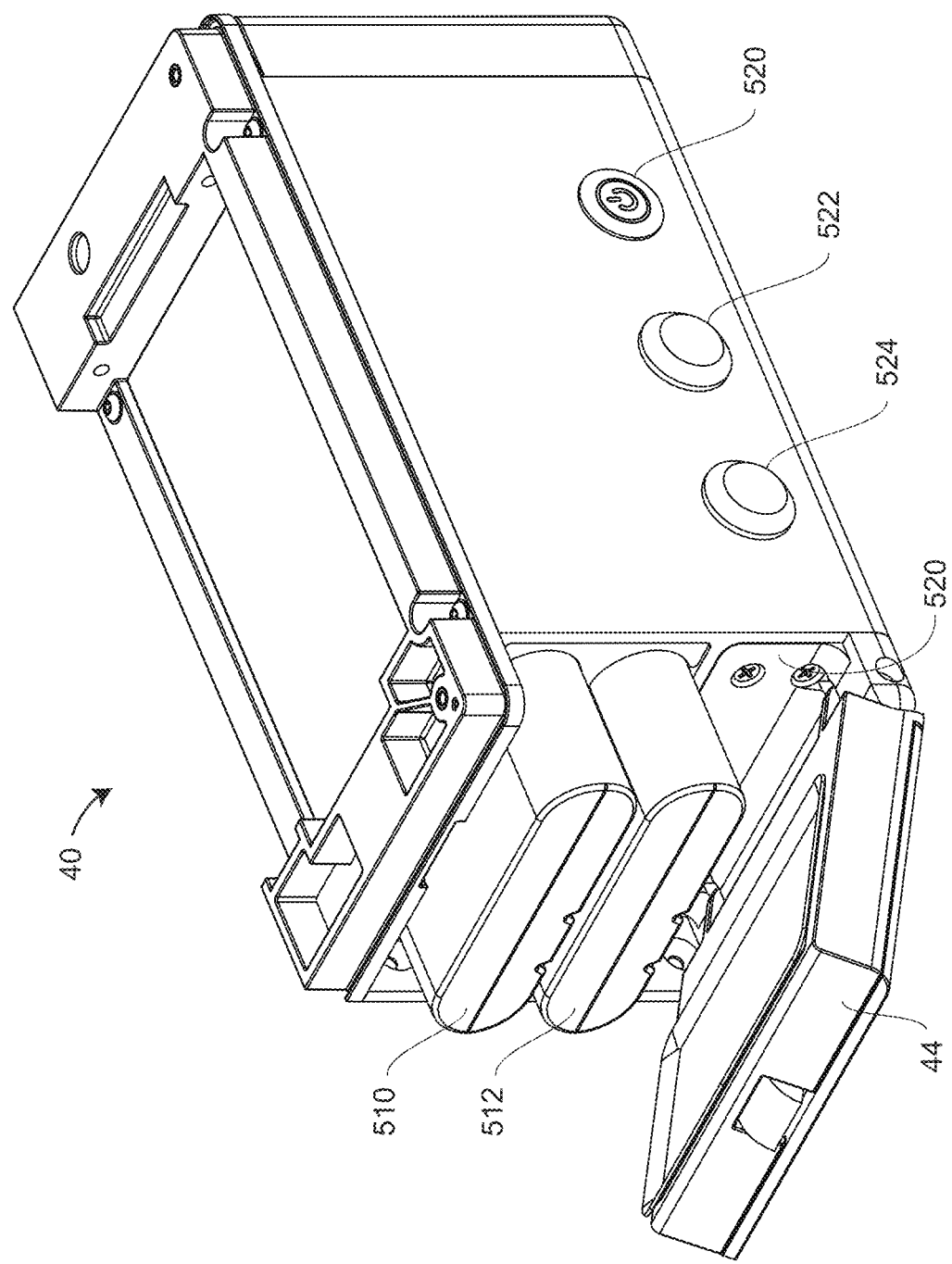
FIG. 5 is an isometric view of an opened power-battery compartment according to an embodiment.

FIG. 5 is a partially exploded isometric view of the power assembly 40 that includes the door 44 opened to reveal two battery units 510, 512 and a circuit board compartment 520. In an embodiment, the batteries 510, 512 may be removed or inserted without turning off power to the light projector 10. The power assembly further includes an on-off switch 530, a connector for optional input power 522, and an Ethernet connector 524.

Figure 6A:
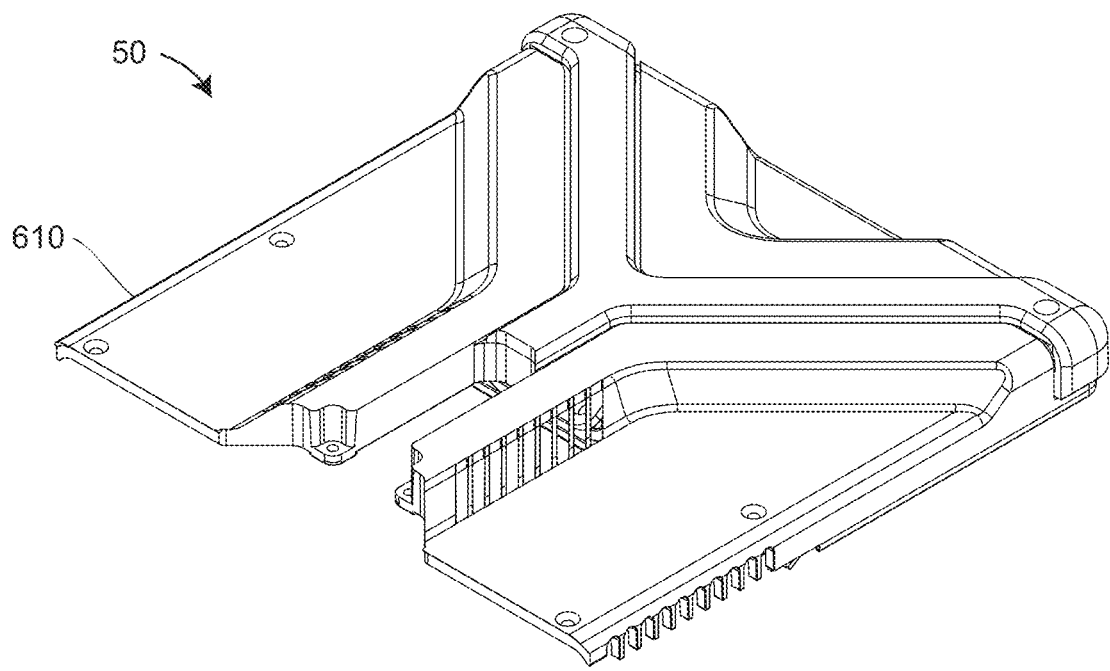
FIGS. 6A, 6B are isometric views of a fan assembly according to an embodiment.
Figure 6B:
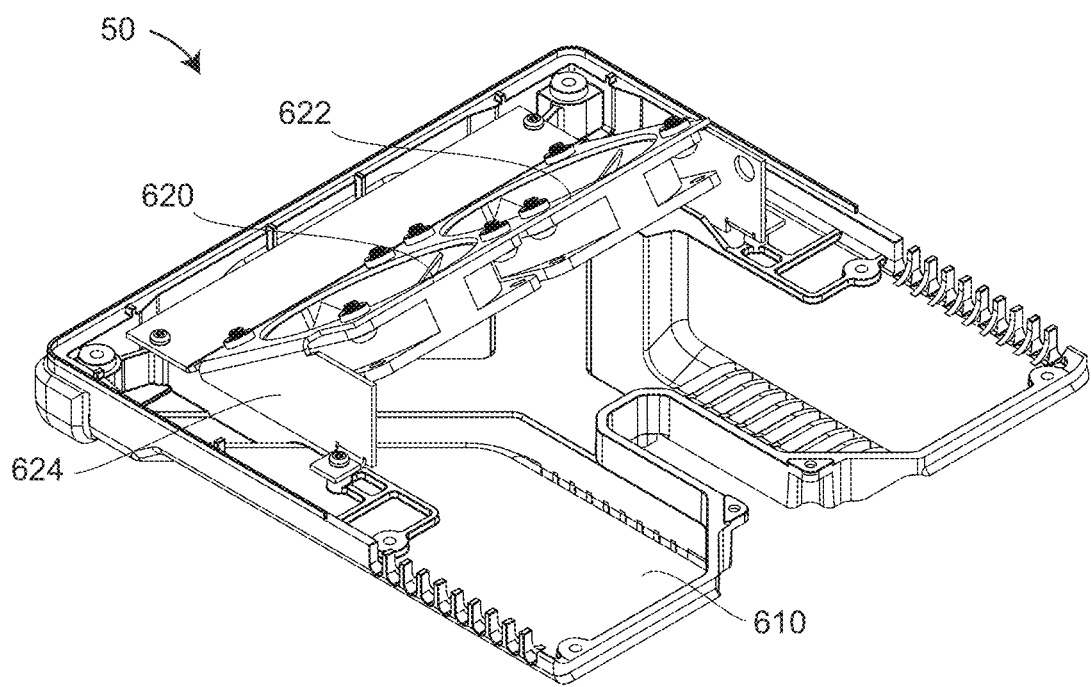

FIGS. 6A, 6B are top isometric and bottom isometric views, respectively, of a fan assembly 50. From the top isometric view, FIG. 6A shows the fan plenum 610, which is the part of the fan assembly that circulates air to components of the light projector 10. The fan assembly further includes two cooling fans 620, 622 and a cooling fan mount 624.

Figure 7:
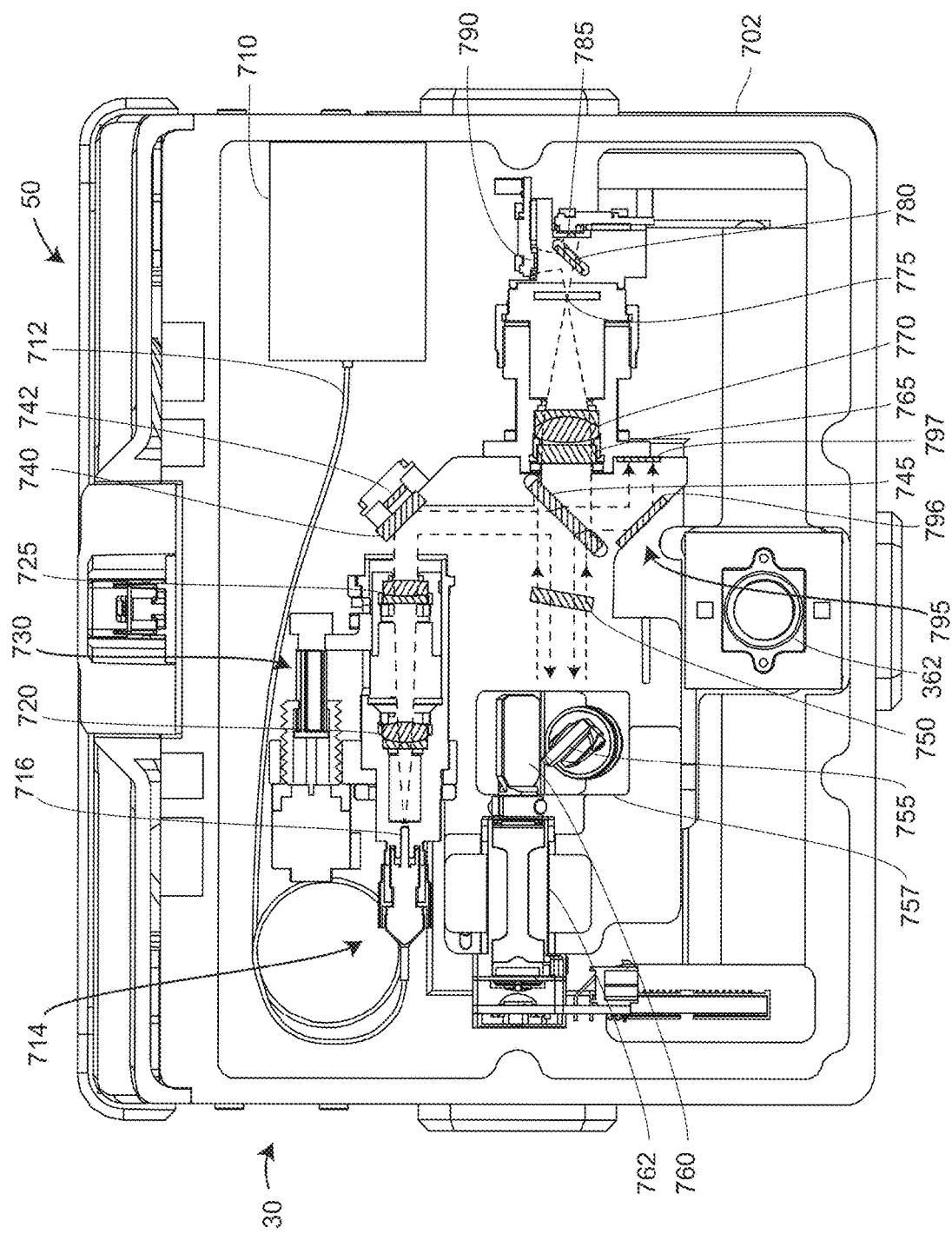
FIG. 7 is a partially cross-sectional, front interior view of the light projection system according to an embodiment.

FIG. 7 is a front view of the base assembly 30. In this view, some components are shown in cross section, including the base housing 702, the fan assembly, and optical components such as lenses, beam splitters, and detectors. A laser 710 launches polarized light into a polarization maintaining (PM) optical fiber 712, which terminates in a fiber-optic connector 714 that includes a ferrule 716. Light is launched from the ferrule 716 through a first lens assembly 720 and a second lens assembly 725. A focusing mechanism 730 adjusts the position of the second lens assembly 725 to focus the beam of light to a small spot on an object some distance away from the light projector 10. The light from the second lens assembly 725 proceeds to a folding beam splitter 740. A small amount of the light passes to an optical detector 742 that measures the optical power of the launched laser beam for monitoring purposes. The rest of the laser light reflects off the folding beam splitter 740 and travels to the polarizing beam splitter 745.

In an embodiment, the ferrule 716 is clocked to align the linear polarization of the laser light to the direction of maximum reflection of the polarizing beam splitter 745. The light reflected off the polarizing beam splitter 745 passes through a quarter wave plate 750 oriented to convert the reflected linearly polarized light into circularly polarized light. The circularly polarized light reflects off a first mirror 755 driven by a galvanometer (galvo) motor assembly 757 that further includes a transducer such as an angular encoder (not shown) for measuring the angle of rotation of the first mirror 755. The light reflected off the first mirror 755 passes to a second mirror 760 that sends the light out of the window 316. The second mirror 760 is driven by the galvo motor assembly 762 that further includes an angular transducer (not shown) for measuring the angle of rotation of the second mirror 760.

After striking an object, reflected light passes back through the window 316, reflects off the second mirror 760, reflects off the first mirror 755, and passes back through the quarter wave plate 750. In reflecting off the object, the handedness of the circularly polarized light is reversed. As a result, when passing through the quarter waveplate on the reverse path, the light is converted back to linear polarization oriented at 90 degrees with respect to the outgoing beam of light reflected off the polarizing beam splitter 745. The returning light reaching the polarizing beam splitter 745 is oriented in the direction of minimum reflection (maximum transmission) of the polarizing beam splitter 745, enabling the returning light passes through the polarizing beam splitter 745 with low loss. This arrangement of using a quarter wave plate in combination with a linearly polarizing beam splitter to reduce loss provides a advantage over prior art light projectors. In the usual light projector system, half of the light is lost on a beam splitter on the way out of the light projector and half of the light is lost on the beam splitter on the way back into the light projector. In other words, with the quarter wave plate method described herein, the returning light level may increase by a factor of four than would otherwise be the case.

The returning light passes through an optical bandpass filter 765 that rejects wavelengths outside a narrow band around the projected laser wavelength. In an embodiment, the laser 710 emits light at 520 nm, and the bandpass filter is also centered at 520 nm. A lens 770 focuses the light, which passes through a pinhole 775 before traveling to a beam splitter 780. In an embodiment, the beam splitter 780 transmits 80 percent of the light and reflects 20 percent of the light. In an embodiment, part of the light is transmitted to a relatively high sensitivity silicon photomultiplier (SiPM) detector 785, and another part of the light is reflected to a relatively low sensitivity SiPM detector 790. In an embodiment, the higher sensitivity detector is approximately one thousand times more sensitive than the lower sensitivity detector. By providing two SiPM detectors having different sensitivities, a greater variety of objects can be measured with a scanned laser beam. A range of detector sensitivities is useful, for example, in measuring near objects and far objects and in measuring objects having reflectance ranging from high to low.

In sending the light from the folding beam splitter 740 to the polarizing beam splitter 745, a small amount of light may be transmitted through the beamsplitter. A beam dump 795 absorbs this small amount of light, minimizing any stray, unwanted light. In an embodiment, the beam dump 795 includes an anti-reflection (AR) coated neutral density (ND) filter 796 and a low-reflectance block 797 such as black felt.

Figure 8:
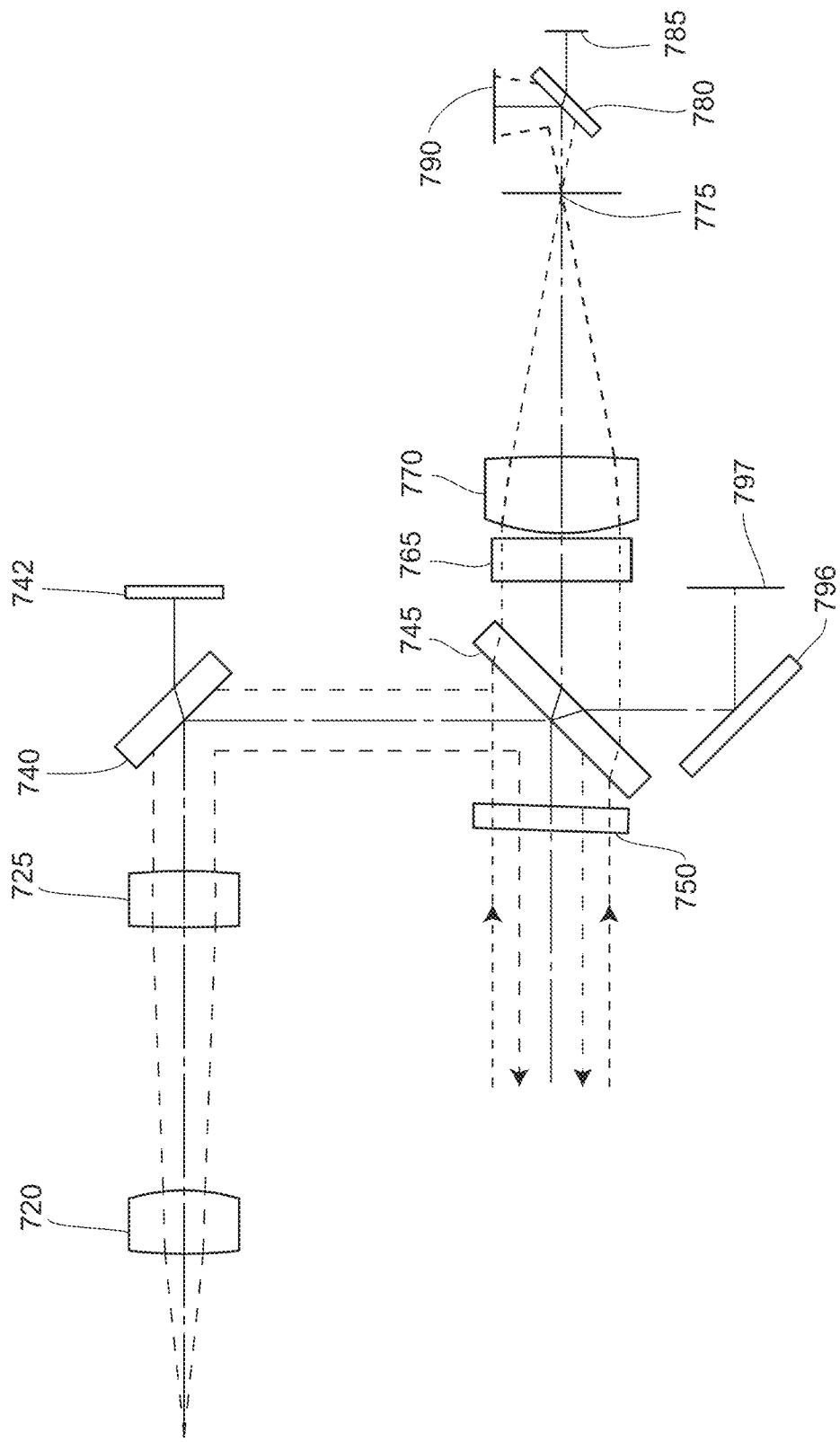
FIG. 8 is a schematic representation of optical elements of the light projection system according to an embodiment.
Figure 9:
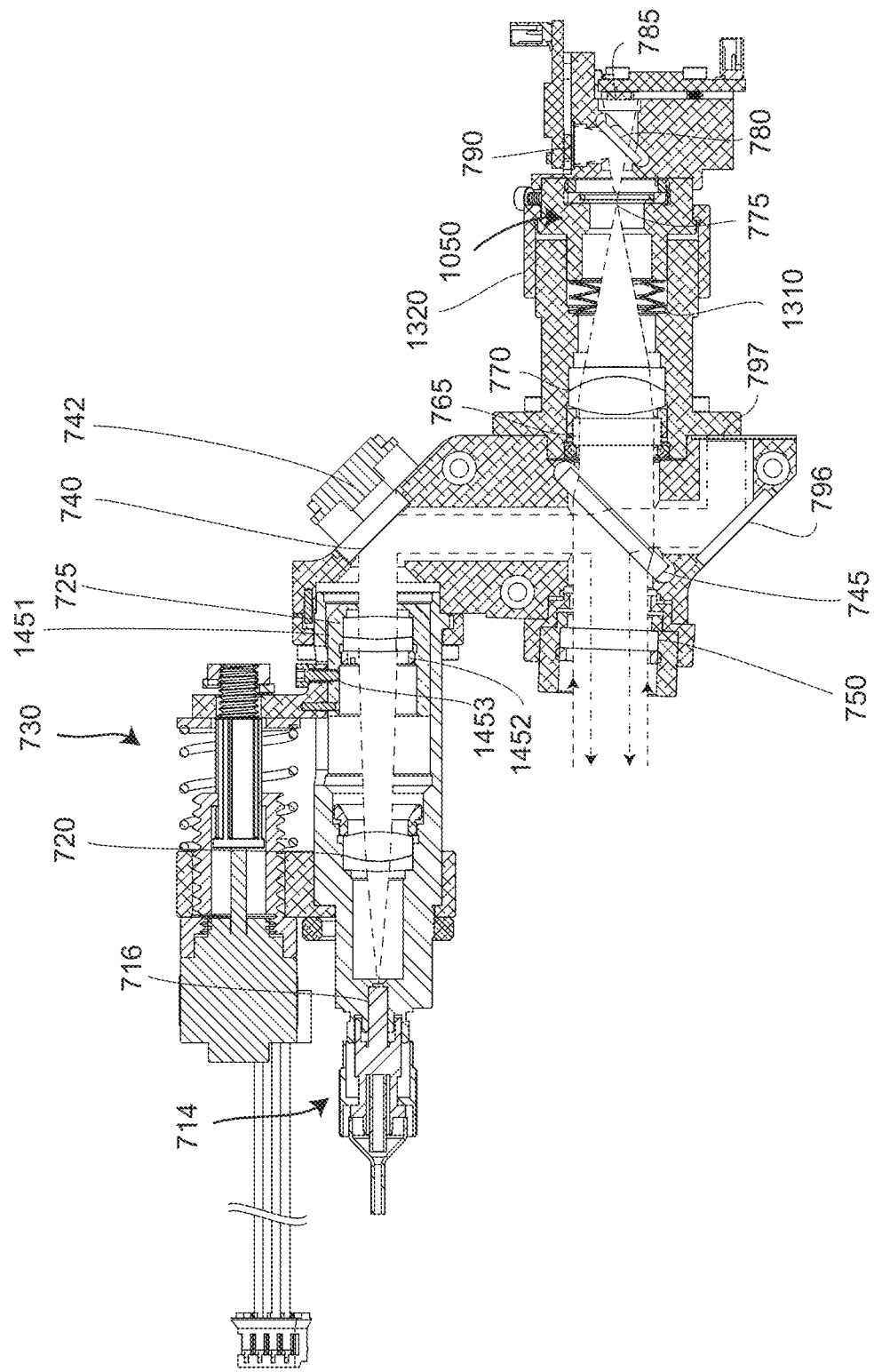
FIG. 9 is a front cross-sectional view of elements in the light projection system according to an embodiment.
Figure 10:
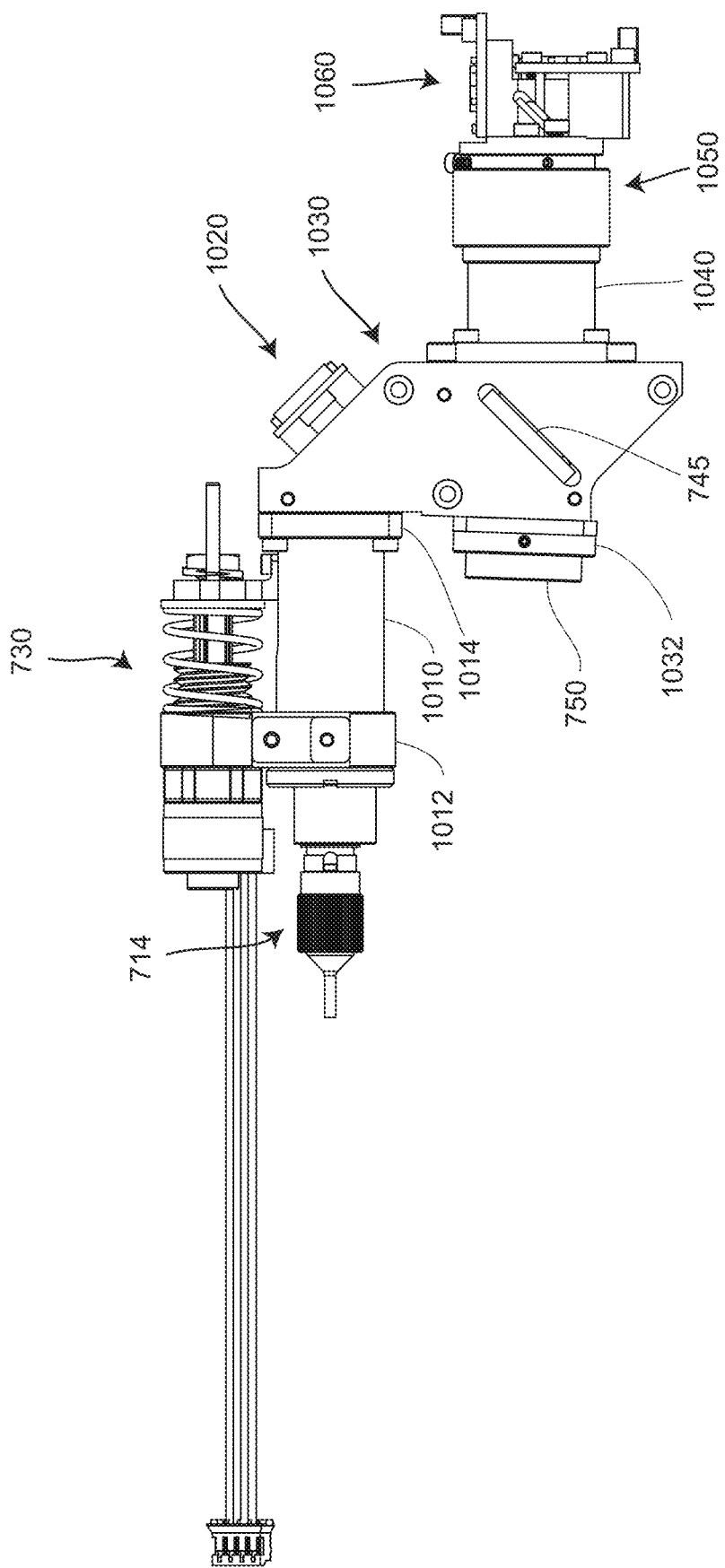
FIG. 10 is a front view of optomechanical elements of the light projection system according to an embodiment.
Figure 11:
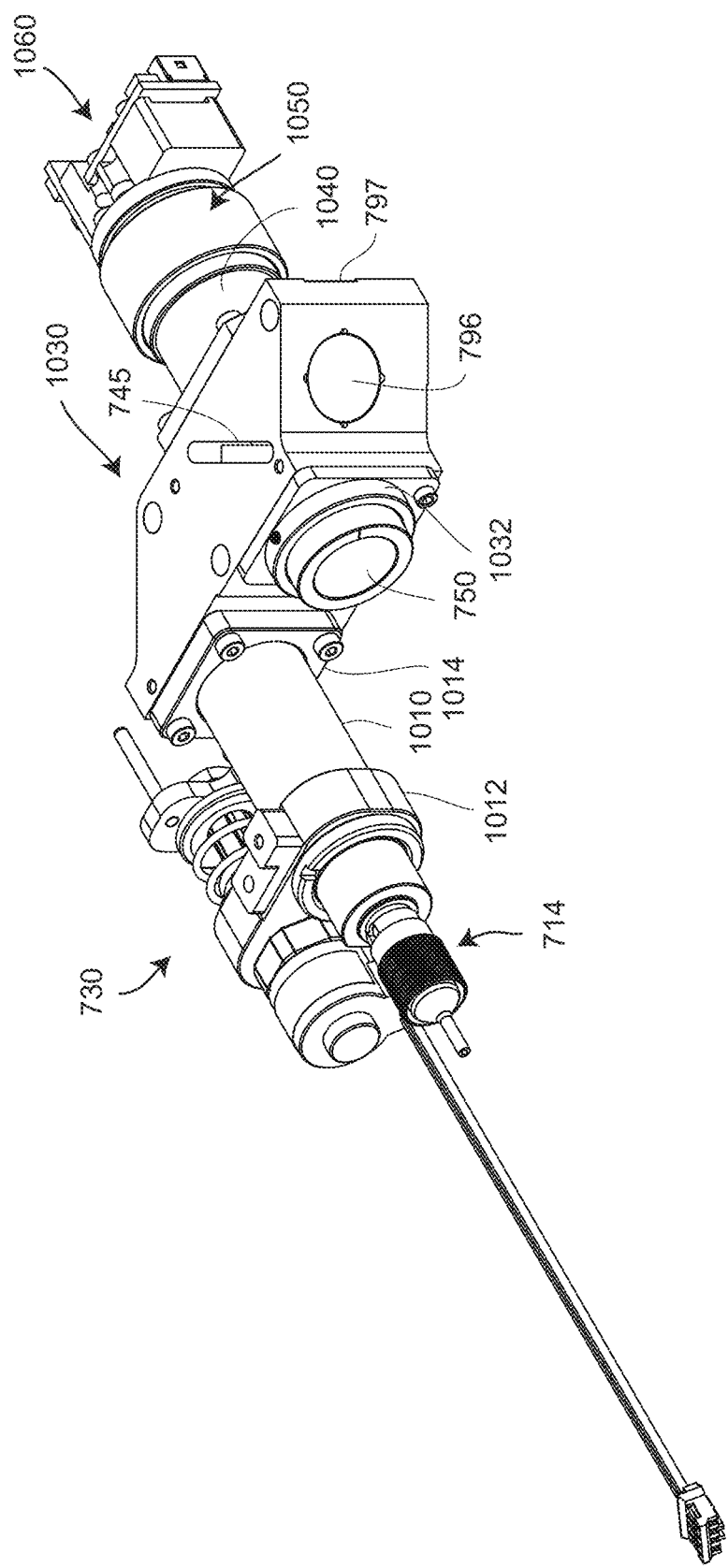
FIG. 11 is an isometric view of optomechanical elements of the light projection system according to an embodiment.
Figure 12:
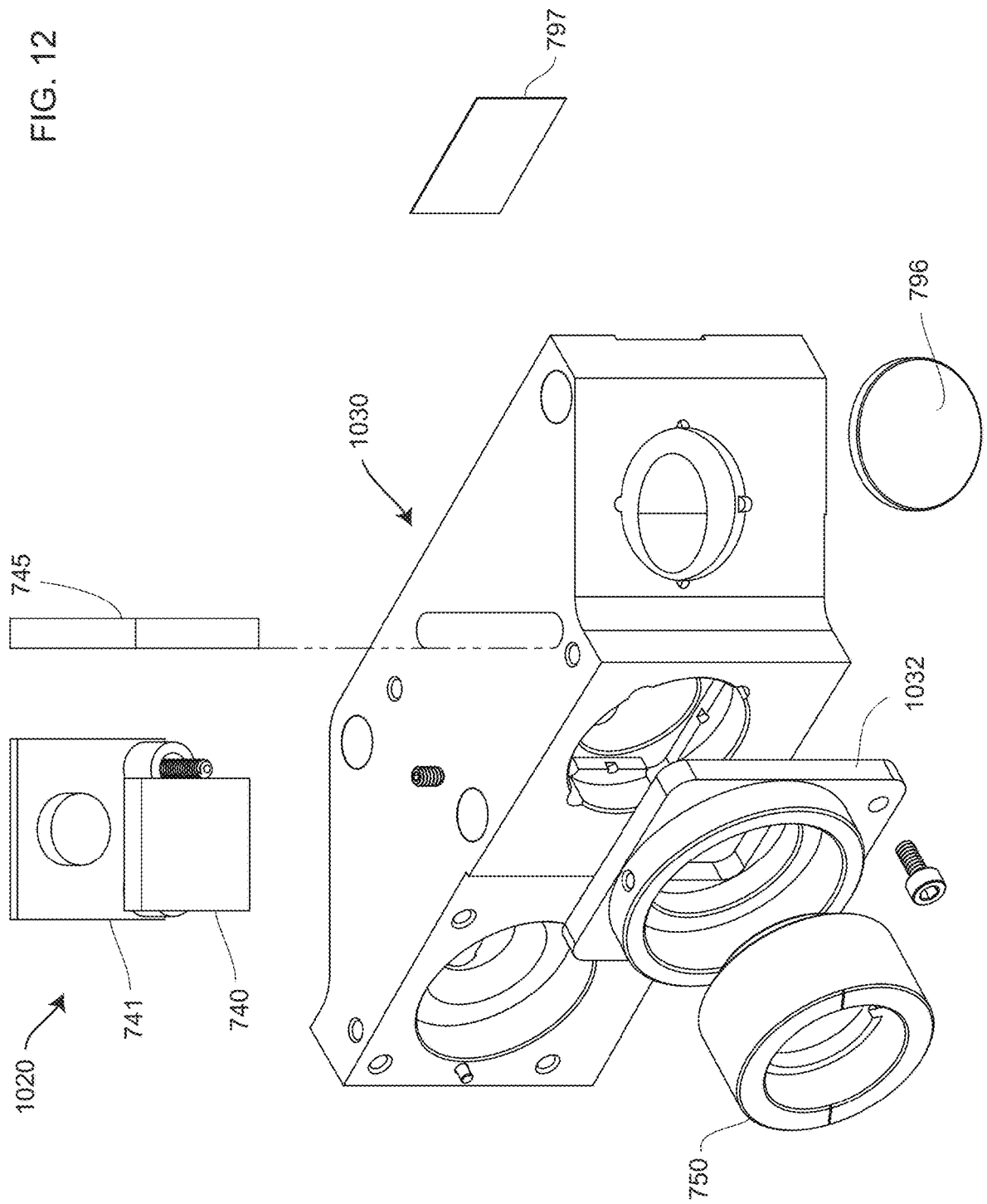
FIG. 12 is an exploded isometric view of an optics housing according to an embodiment.

FIG. 8 is a schematic representation of optical elements included in FIG. 7, with numbering of all optical elements the same as in FIG. 7. FIG. 9 is a cross-sectional view of optical components and their optomechanical supports, with numbering of elements the same as in FIG. 7. FIG. 10 is a top view and FIG. 11 is an isometric view of optical components and their optomechanical supports, with the numbering of elements the same as in FIG. 7. A first optics tube 1010 supports the first lens assembly 720 and the second lens assembly 725. A focus stepper mount 1012 affixes the first optics tube 1010 to the focusing mechanism 730. A tube clamp 1014 affixes the first optics tube 1010 to the beam splitter housing 1030. A power monitor assembly 1020 that includes an optical detector 742 is attached to the beam splitter housing 1030. An adapter mount 1032 attaches the quarter wave plate 750 to the beam splitter housing 1030. In addition, the polarizing beam splitter 745, the AR coated ND filter 796, the low-reflectance block 797, and a second optics tube 1040 attach to the beam splitter housing 1030. A pinhole-adjuster assembly 1050 provides an interface between the second optics tube 1040 and an SiPM detector assembly 1060. FIG. 12 is an exploded isometric view of the beam splitter housing 1030 and attached components numbered as in FIG. 7. Optical detector PCBA 741 includes the optical detector 742 (FIGS. 7, 8).

Figure 13:
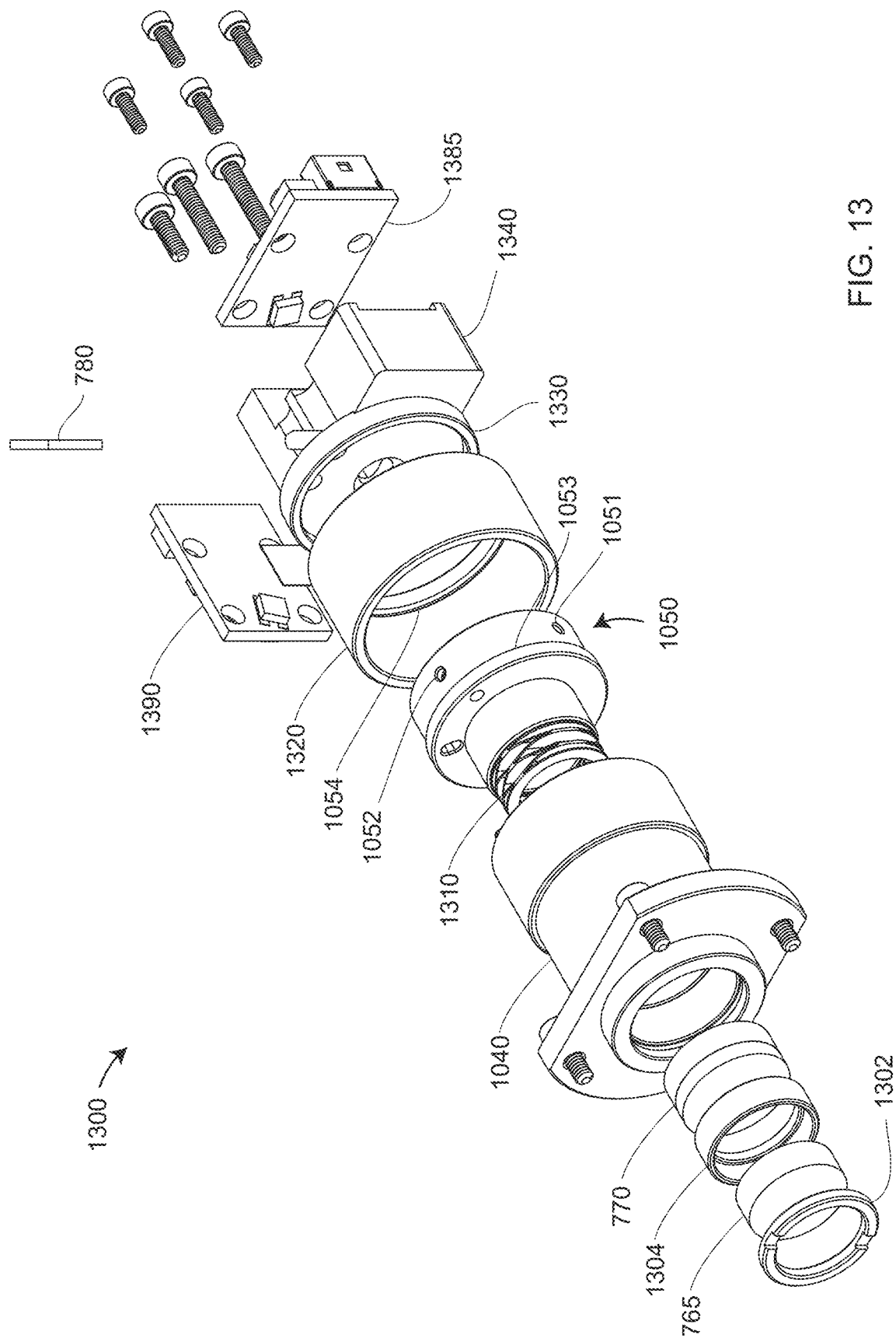
FIG. 13 is an exploded isometric view of a return optics assembly according to an embodiment.

FIG. 13 is an exploded isometric view of a return optics assembly 1300 that includes a retaining ring 1302, the optical bandpass filter 765, a spacer 1304, the lens 770, the second optics tube 1040, a wave spring 1310, the x-y adjustment assembly 1050, a z-alignment ring 1320, an ND filter 1330, a dual-sensor mount 1340, the beam splitter 780, a first SiPM PCBA 1390, and a second SiPM PCBA 1385. In an embodiment, the first SiPM PCBA 1390 includes the relatively low sensitivity SiPM detector 790, while the second SiPM PCBA 1385 includes the relatively high sensitivity SiPM detector 785. The pinhole-adjuster assembly includes an x-y adjustment assembly 1050, which is coupled to a z-adjustment assembly that includes the second optics tube 1040, the z-alignment ring 1320, and the wave spring 1310. The pinhole aperture is a small plate having a small hole, ordinarily less than 100 micrometers in diameter. The x-y adjustment assembly 1050 includes a threaded x hole 1051 and a similar hole on the opposite side of 1051. In an embodiment, a compression spring is placed in one of these holes followed by a set screw. A set screw is screwed into the opposite threaded x hole. By adjusting the positions of the set screws, the pinhole can be adjusted in the x direction. The x-y adjustment assembly 1050 further includes a threaded y hole 1052 and a similar hole on the opposite side of 1052. In an embodiment, a compression spring is placed in one of these holes followed by a set screw. A set screw is screwed into the opposite threaded y hole. By adjusting the positions of the set screws, the pinhole can be adjusted in the y direction. The x-y adjustment stage slides into the z-alignment ring 1320 until the edge 1053 of the x-y adjustment stage encounters the circular ridge 1054 of the z-alignment ring 1320. With the x-y stage in this position, the holes 1051, 1052 are accessible allowing the x-y adjustment to be made after the attachment to the z-alignment ring. The z-alignment ring has an internal thread that matches the external thread of the second optics tube 1040. The wave spring 1310 is placed against the x-y adjustment ring 1050. The spring provides a force to keep the edge 1053 in contact with the circular ridge 1054 as the z-alignment stage is screwed in and out to obtain the proper pinhole aperture position in the z-direction. A cross-sectional view of the elements of the pinhole aperture and pinhole adjustment assembly is shown FIG. 9.

By adjusting the set screws, the pinhole aperture can be centered on the returning light. The pinhole aperture 775 (FIGS. 7, 8, 9) helps to block unwanted background light from the environment outside the enclosure of the light projector 10. Examples of such unwanted background light blocked by the aperture include artificial light and sunlight, both direct and reflected. In a further embodiment, the frame that holds the lens and pinhole assembly is at least partially covered with a coating to suppress reflections from the light traveling between the lens 770 and the pinhole 775. In the embodiment illustrated in FIG. 9, the inner elements of the frame that may be coated include an inner portion of the second optics tube 1310 and an inner portion of the x-y adjustment assembly 1050. In an embodiment, the coating applied to the inner elements of the frame is a material such as Acktar Magic Black coating that can reduce reflections from metal to about one percent for visible wavelengths. Acktar Ltd. Has its headquarters in Kiryat-Gat, Israel.

Figure 14:
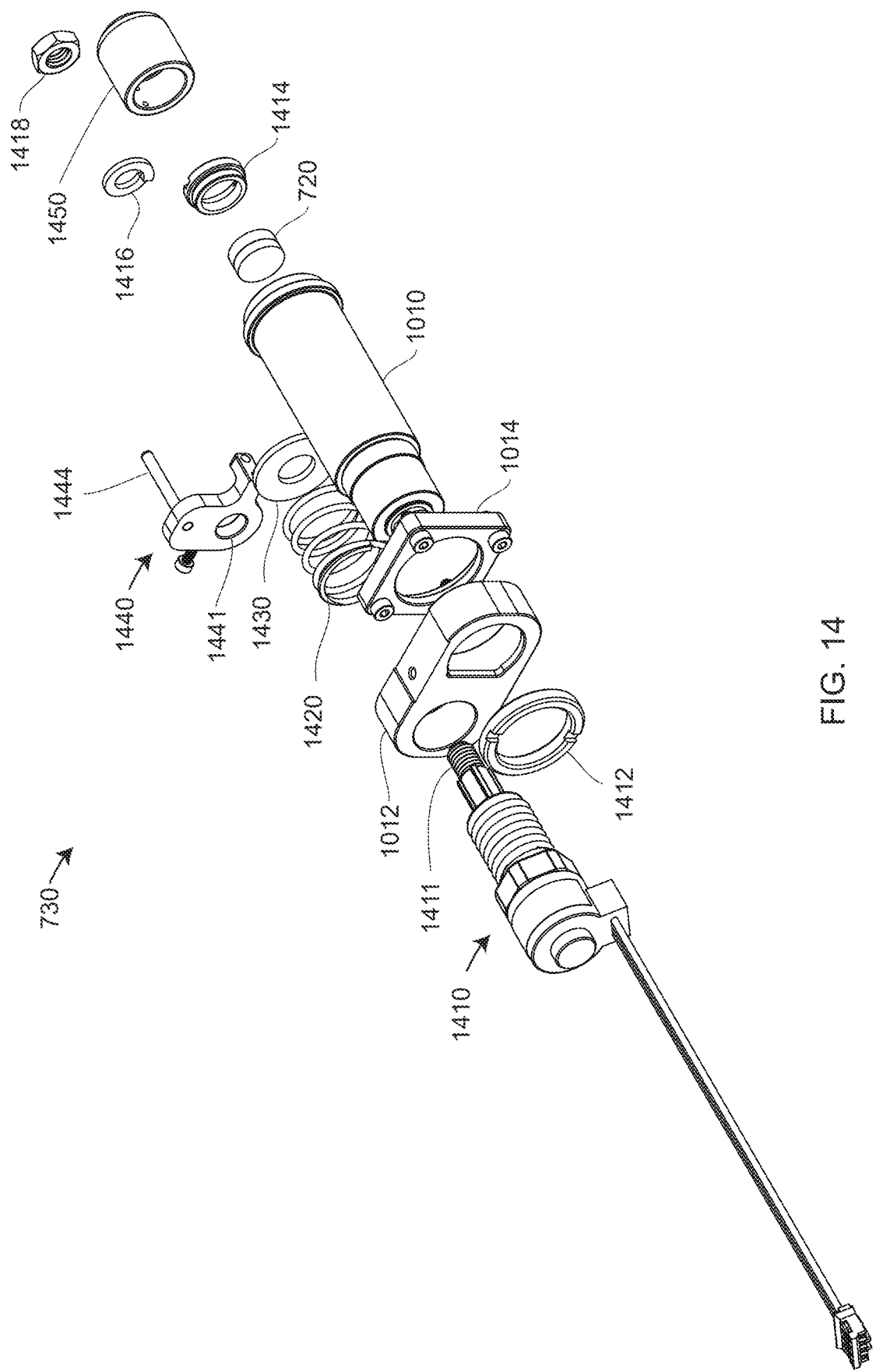
FIG. 14 is an exploded isometric view of a focusing assembly according to an embodiment.

FIG. 14 is an exploded isometric view of the focusing mechanism 730, along with components attached to and actuated by the focusing mechanism 730. The focusing mechanism includes a stepper motor 1410, a retaining ring 1412, the focus stepper mount 1012, a spring 1420, an oversized washer 1430, a focus slide connector 1440, a lock washer 1416, and a nut 1418. Elements attached to the focusing mechanism 730 include the tube clamp 1014, the first optics tube 1010, the first lens 720, a retaining ring 1414, and a sliding focus assembly 1450. FIG. 9 shows a cross-sectional view of the three elements of the sliding focus assembly 1450, which include the sliding focus mount 1451, the second lens 725, and the retaining ring 1452. The sliding focus mount 1451 is attached to the focus slide connector 1440 with a screw 1453, as shown in FIG. 9. The stepper motor 1410 includes a threaded portion 1411 that passes through hole 1441 in the focus slide connector 1440. The lock washer 1416 and nut 1418 attach to the threaded portion 1411 of the stepper motor. The spring 1420 and the oversized washer 1430 provide compressive force to hold the focus slide connector 1440 firmly to against the lock washer 1416. The focus slide connector 1440 also includes a rod 1444 used to trigger a photogate sensor when setting a home position for the focus slide connector 1440.

The purpose of the focusing mechanism 730 is to focus the beam of light from the light projector 10 on an object of interest. A method for making this adjustment using a focusing mechanism is described in commonly owned U.S. patent application Ser. No. 16/017,360 filed on Jun. 25, 2018, the contents of which are incorporated by reference herein.

Figure 15:
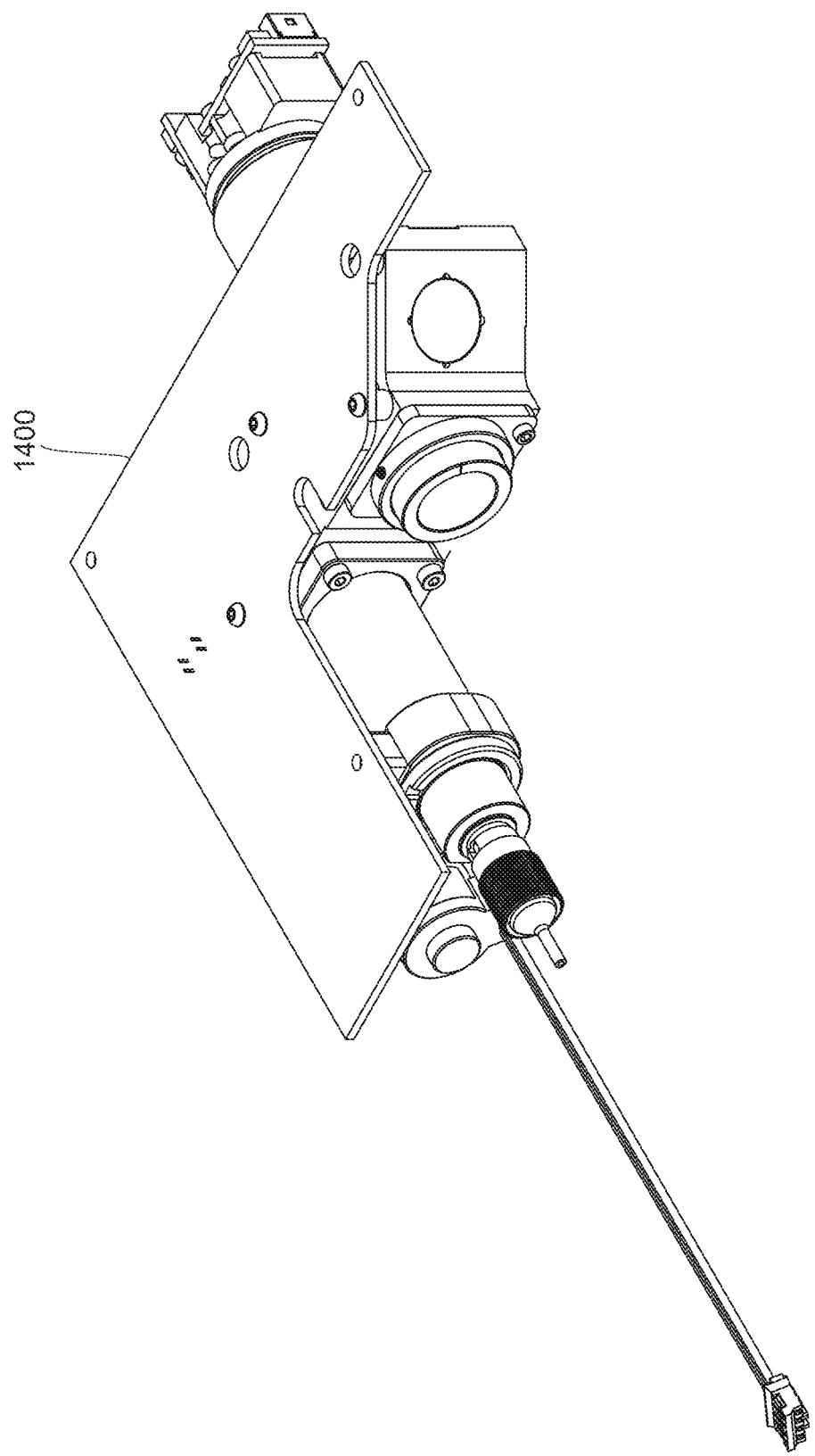
FIG. 15 is an isometric view of optomechanical elements of the light projection system, including an optoelectrical control board, according to an embodiment.

FIG. 15 is an isometric view of the optical components and their optomechanical supports as shown in FIG. 14 with the addition of an optoelectrical control board 1400. The optoelectrical control board includes electrical circuits to cooperate with PCBAs having optical detectors 742, 785, and 790. It also includes electrical circuits to control the focusing mechanism 730.

Figure 16:
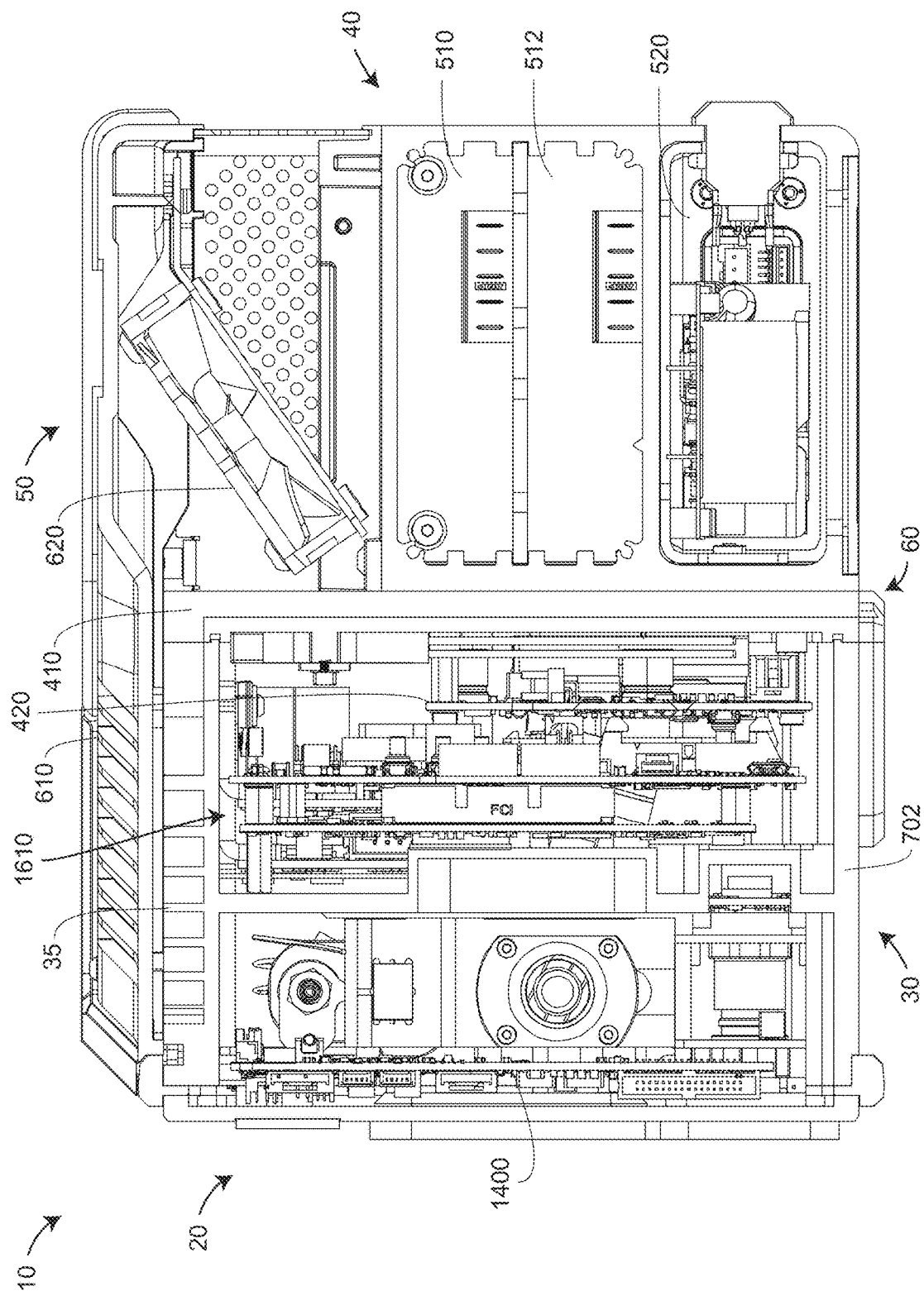
FIG. 16 is cross-sectional side view of the light projection system according to an embodiment.

FIG. 16 is a cross-sectional side view of the light projector system 10. Shown are the front cover assembly 20, the base assembly 30, the power assembly 40, the fan assembly 50, and the rear assembly 60. The base assembly includes the base housing 702, an outer portion of which includes the grooved heat sinks 35. Shown within the base assembly 30 are the optoelectrical control board 1400, some optical and optomechanical components, and some PCBAs 1610. The power assembly 40 includes batteries 510, 512, and the circuit board compartment 520. The fan assembly 50 includes the fan plenum 610 and a cooling fan 620. The rear assembly 60 includes the rear panel 410 and the power distribution PCBA 420.

Figure 17:
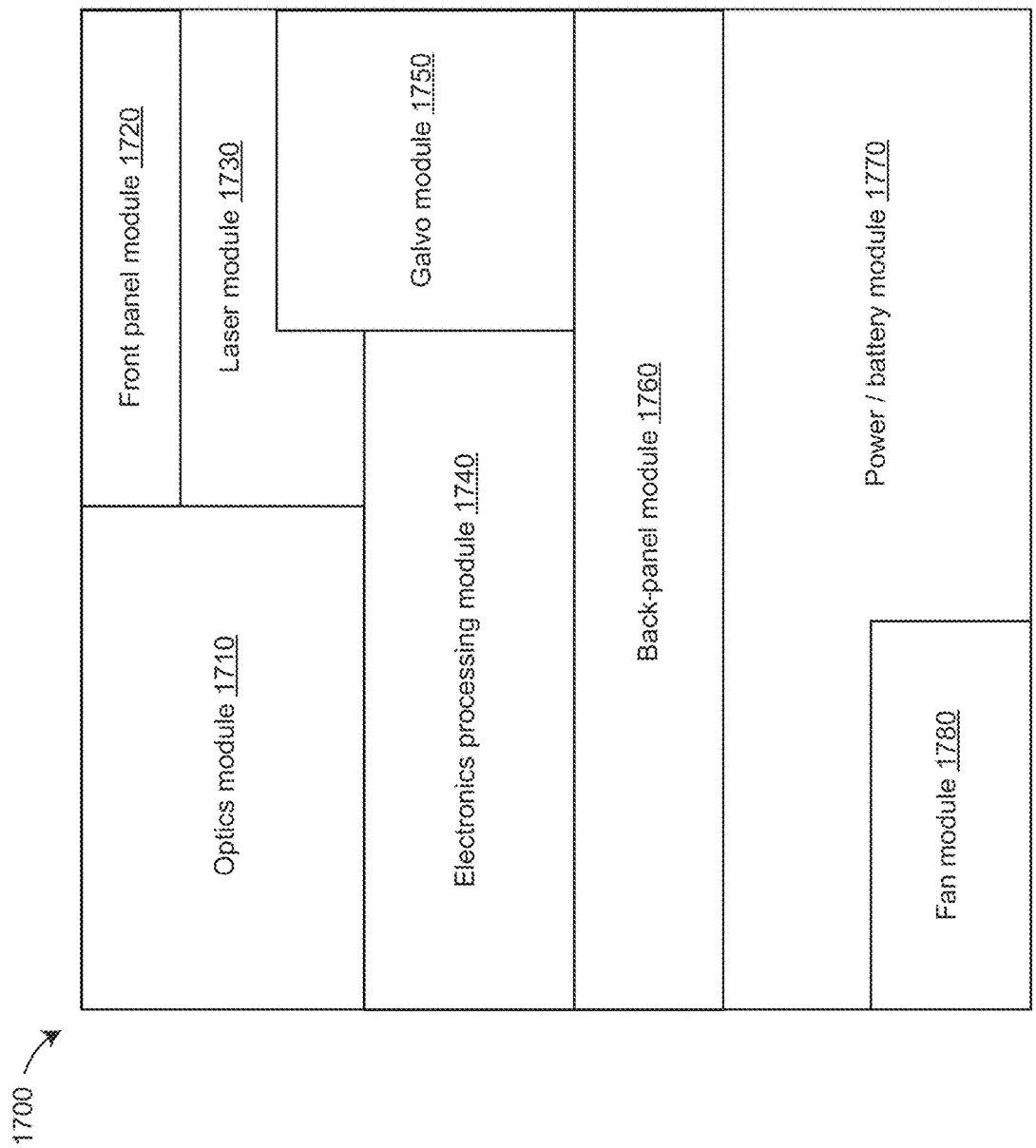
FIG. 17 is a block diagram of electrical modules of the light projection system according to an embodiment.

FIG. 17 is a block diagram of electrical modules 1700 within the light projection system 10 according to an embodiment. Each module may be constructed and tested separately from the other modules. In most cases, each module includes a PCBA. Electrical modules 1700 include optics module 1710, front panel module 1720, laser module 1730, electronics processing module 1740, galvo module 1750, back-panel module 1760, power/battery module 1770, and fan module 1780.

Figure 18A:
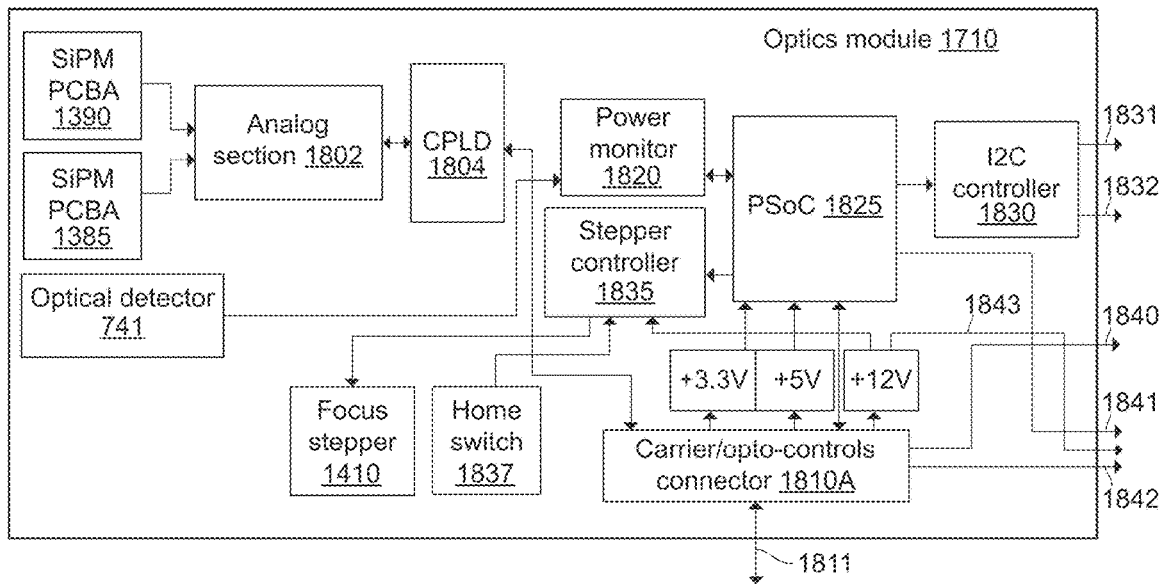
FIG. 18A is an electrical block diagram for an optics module according to an embodiment.

FIG. 18A is a block diagram of electrical elements of the optics module 1710. In an embodiment, the optics module 1710 includes the first SiPM PCBA 1390, the second SiPM PCBA 1385, the optical detector PCBA 741. Electrical signals from the first SiPM PCBA 1390 and the second SiPM PCBA 1385 go to an analog section 1802 that includes a transimpedance amplifier and other electrical conditioning components. The analog section 1802 includes an analog-to-digital converter (ADC) that converts the processed analog signals to digital signals for transmission to a complex programmable logic device (CPLD) 1810 for further processing. The processed signals from the CPLD 1804 pass over wires to the carrier-opto controls connector 1810A. Electrical signals pass between the carrier/opto-controls connector 1810A over a cable 182 to a carrier/opto-controls connector 1810B on the electronics processing module 1740. The electrical signal from the optical detector PCBA 741 is sent to power monitor 1820, which provides processed data to a processor device, which in an embodiment is a programmable system-on-a-chip (PSoC) 1825. A PSoC is a family of microcontroller integrated circuits manufactured by Cypress Semiconductor, a company having headquarters in San Jose, Calif. Other types of processor devices different than a PSoC may be used in place of the PSoC 1825. In an embodiment, the PSoC 1825 sends signals to an I2C controller 1830 that sends one set of control signals 1831 to the four status LED PCBAs 340 and other signals 1832 to the IR LED PCBA 370. The PSoC 1825 also sends signals to a stepper controller 1835 that sends signals to the stepper motor 1410, which adjusts the position of the second lens 725 to focus the projected light on an object. The home switch 1837 sets a home position by triggering when the rod 1444 passes in front of a photogate sensor.

Figure 18B:
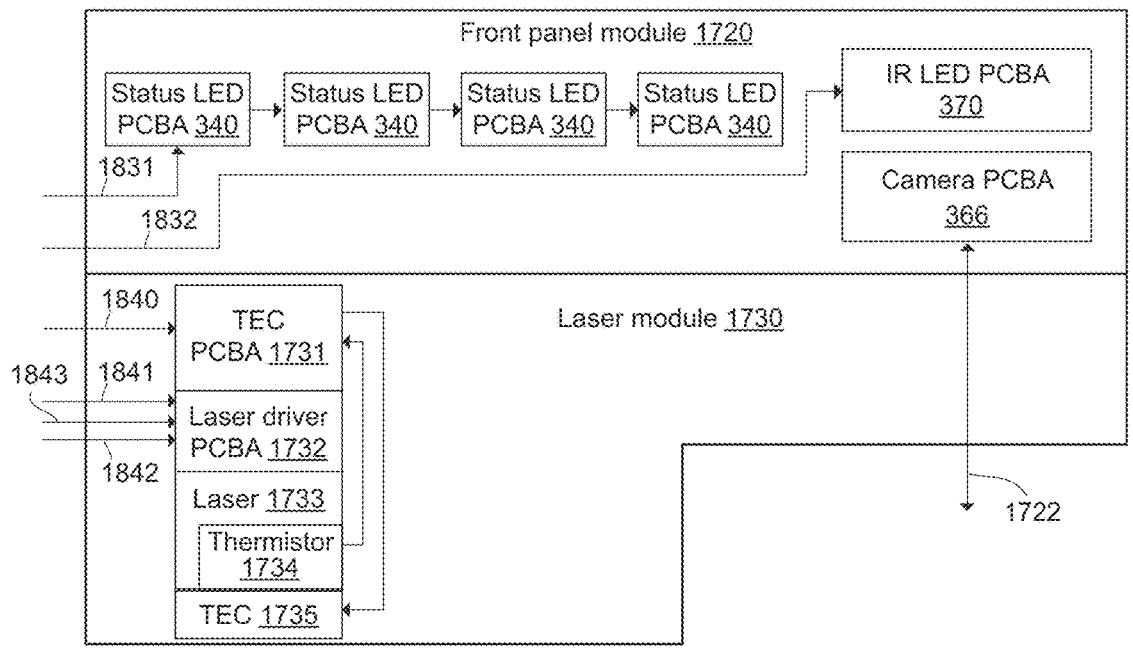
FIG. 18B is an electrical block diagram for a front panel module and a laser module according to an embodiment.

FIG. 18B is a block diagram of electrical elements of the front panel module 1720 and the laser module 1730. The laser module 1730 includes a laser 1733 having a built-in thermistor 1734 and in contact with a thermoelectric controller (TEC) 1735. The laser 1733 and built-in thermistor 1734 are included in the laser 710 (FIG. 7). The laser module 1730 further includes a TEC PCBA 1731, and a laser driver PCBA 1732. Power is provided to the TEC PCBA 1731 over the line 1840 from the optics module 1710. Additional power is supplied to the laser driver PCBA 1732 by the +12 V supply over the line 1843. on the optics module provides power to the TEC PCBA 1731 over the line 1840. The laser driver PCBA receives additional control signals via control line 1841 from the PSoC 1825 and 1842 from the cable 1811. The thermistor 1734 measures the temperature of the laser 1733 and provides the measured temperature to the TEC PCBA 1731, which adjusts the TEC 1735 to hold the laser temperature to a desired set point.

Figure 18C:
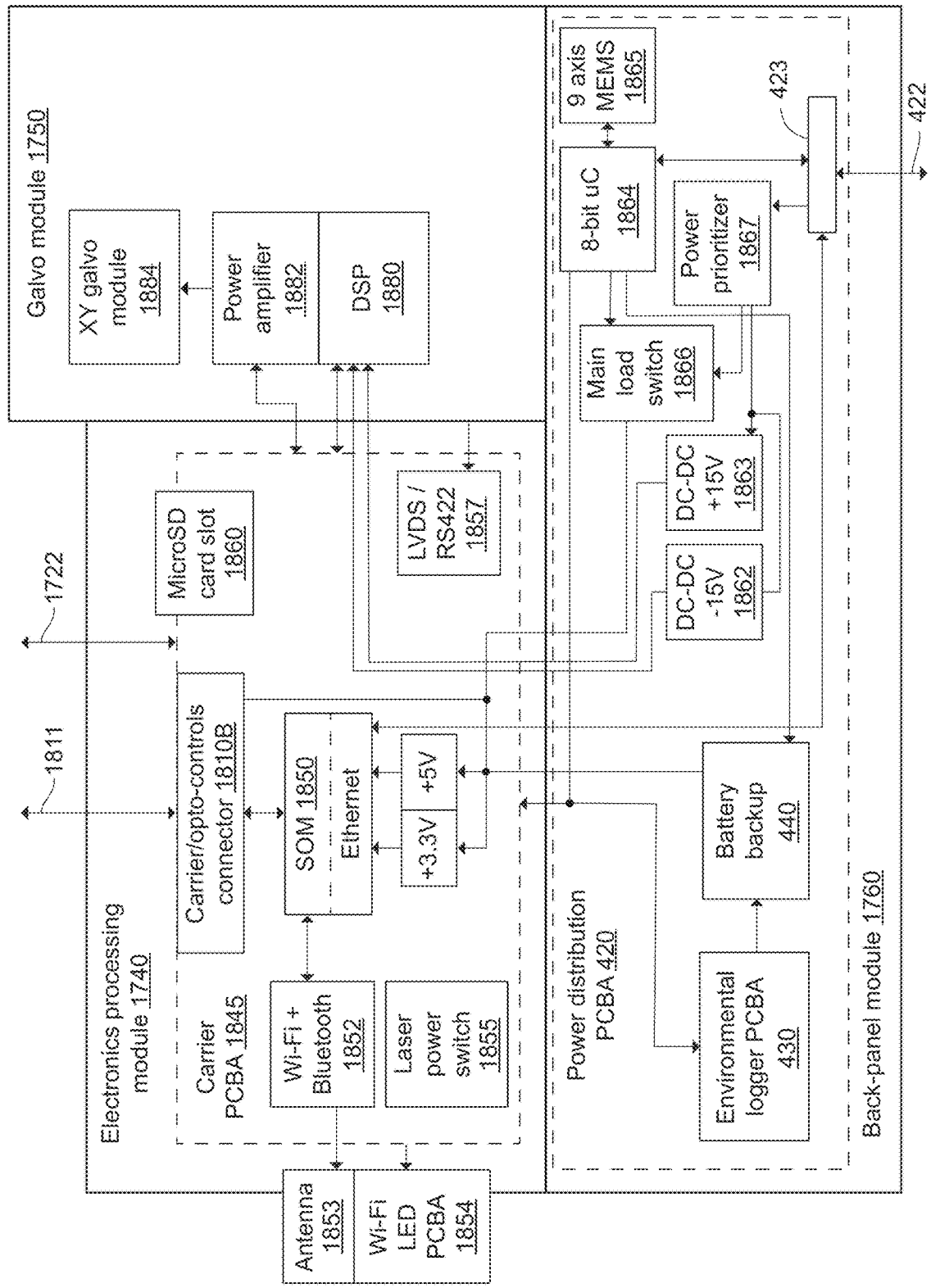
FIG. 18C is an electrical block diagram for an electronics module, a galvo module, and a back-panel module according to an embodiment.

FIG. 18C is a block diagram of electrical elements of the electronics processing module 1740, the galvo module 1750, and the back-panel module 1760. The electronics processing module 1740 includes a carrier PCBA 1845 for a System-On-Module (SOM) 1850 and a collection of additional electrical components that interface with the SOM. In an embodiment, the SOM is a PicoZed, a device sold by Avnet and based on models of Xilinx System-on-a Chip (SoC). Avnet has its headquarters in Phoenix, Ariz. Xilinx has its headquarters in San Jose, Calif. The SOM 1850 is placed on the carrier PCBA 1845 that includes a Wi-Fi and Bluetooth component 1852 that interfaces with an antenna 1853. The SOM 1850 also supports a Wi-Fi LED PCBA 1854. Wi-Fi is a trademark of the non-profit Wi-Fi Alliance. Wi-Fi devices are compliant with the IEEE 802.11 standard. Bluetooth is a wireless technology standard used for exchanging data between fixed and mobile devices over short distances using radio waves between 2.4 and 2.485 GHz. Bluetooth standards are maintained by the Bluetooth Specification Working Group (CSWG). The Wi-Fi may be used as a client to interface with already established network or as an access point for establishing links to computers or other instruments not connected to a network. The carrier PCBA 1845 supports a laser power switch 1855 for turning the laser 710 on and off. The carrier PCBA 1845 includes low-voltage differential signaling (LVDS) circuitry 1857 to the standard RS-422, also known as TIA-EIA-422. This technical standard specifies the electrical characteristics of a differential, serial communication protocol. The SOM supports Ethernet and is interconnected through the ribbon cable 422 to the Ethernet connector 524 on the power assembly 40. The first header 423 for the ribbon cable 422 resides in the back-panel module 1760. The carrier module 1845 further includes a MicroSD card slot 1860 that enables reading and writing of data on MicroSD cards. In an embodiment, the SOM 1850 communicates with the camera PCBA 366 over a Universal Serial Bus (USB) link 1722. USB is an industry standard maintained by the USB Implementer's Forum.

The back-panel module 1760 includes an environmental logger PCBA 430 that in an embodiment includes two accelerometers for measuring two different maximum acceleration levels. It also includes a combination humidity/temperature sensor, an oscillator to drive a real-time clock, and nonvolatile memory for logging extreme events with time stamps. Such extreme events may include large shocks, relatively very high temperatures or humidities or relatively very low temperatures. A battery 440 is provided to power the elements in the environmental logger PCBA 430 even when the power to the unit is turned off, for example, when a unit is shipped with batteries removed. The battery 440 also provides short term power for the carrier PCBA 1845 for around a minute when batteries 510, 512 are removed and electrical power is otherwise not provided. In this way, state information for the system is preserved long enough to allow a battery to be exchanged. The battery 440 also provides power to an 8-bit microcontroller 1864 that is attached to a nine-axis MEMS inertial measurement unit (IMU) 1865.

Figure 18D:
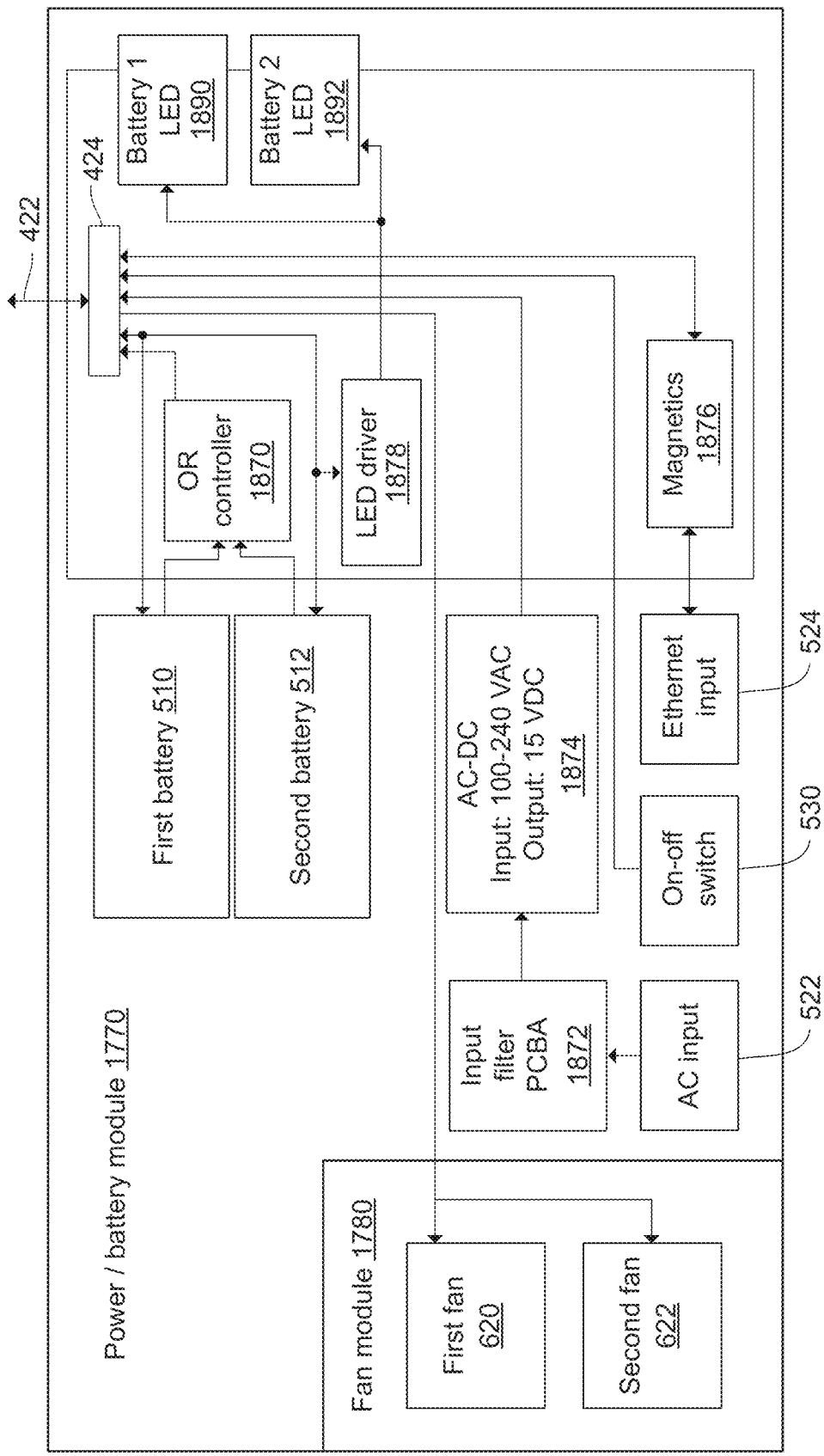
FIG. 18D is an electrical block diagram for a power/battery module according to an embodiment.

FIG. 18D is a block diagram of the power/battery module 1770. The OR controller 1870 cooperates with the power prioritizer 1867 and the main load switch 1866 to determine the amount of current, if any, drawn from each of the first battery 510 and the second battery 512. Some of the resulting power is provided to DC-DC converter 1862 that produces −15 volts and DC-DC converter 1863 that produces +15 volts. These voltages are provided to the digital signal processor (DSP) in the galvo module 1750. AC power is provided through the input port 522, which is sent to an electrical input filter PCBA 1872 and on to an AC-DC converter 1874 that convert AC voltages between 100 and 240 VAC into a DC voltage of +15 VDC. The Ethernet input signal is sent to a magnetics unit 1876 that serves as an isolation transformer for the Ethernet signal. An LED driver

1878 provides signals to a first battery LED status indicator or DSP 1890 and a second battery LED status indicator or DSP 1892.

FIG. 18C shows the electrical elements of the galvo module 1750 that support the galvo motor assemblies 757, 762. In an embodiment, the electronics of the galvo module make use of electrical and algorithmic methods to reduce the power consumed by the galvo motors while continuing to provide high visibility in the pattern of light projected by the light projector 10. Methods for obtaining this power reduction are described in commonly owned U.S. Patent Application No. 62/925,257 filed on Oct. 24, 2019, the contents of which are incorporated by reference herein. These methods include adjusting the output of a power control module based at least on one or more calculated parameters that control the trajectory of the projected beam of light on the object. In an embodiment shown in FIG. 18C, a power amplifier 1882 drives an XY galvo module 1884 that controls the movements of the galvo motor assemblies 757, 762. In an embodiment, the parameter-based trajectory is determined at least in part by the DSP 1880. In an embodiment, one of the calculated parameters is the refresh rate for the flicker-free threshold of the projected beam of light. In an embodiment, the power amplifier 1882 is a switching mode current amplifier having an output based on a configurable effective duty cycle.

Figure 19:
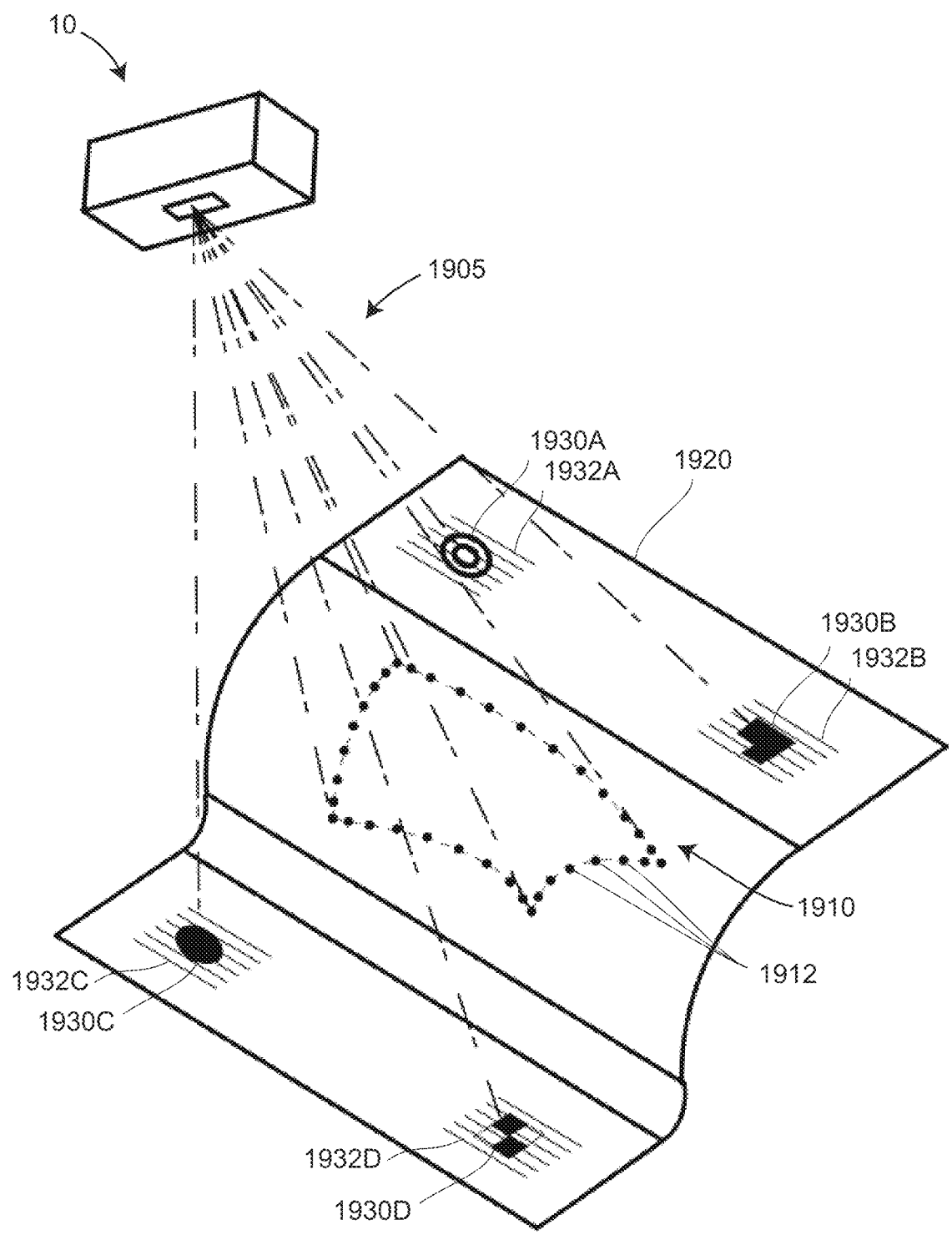
FIG. 19 is a schematic representation of a light projection system projecting patterns of light onto an object according to an embodiment.

In FIG. 19, the light projector 10 projects a glowing pattern of light 1910 onto an object of interest 1920. This glowing pattern of light is sometimes referred to as a "template." In general, the projected pattern of light 1910 is repeated periodically at a given time interval, which is the period of the projected pattern. The reciprocal of the period of the projected pattern is called the refresh rate. If the refresh rate is too low, the glowing pattern will appear to observers to be flickering and will appear to flash at regular intervals. A flickering pattern can cause observers to experience fatigue, dizziness, and headaches. To avoid this problem, the refresh rate is set high enough that a viewer observes the glowing pattern as a steady, flicker-free image. Such a flicker-free image is related to persistence of vision experienced when viewing motion pictures in cinema or on television. In some embodiments, it is also desired that the projected glowing pattern of light 1910 be bright enough to be clearly visible to an observer. At the same time, it is desired that a glowing pattern of light 1910 meet the eye safety limit for laser light.

In addition to projecting a glowing pattern of light 1910 on an object of interest 1920, light projectors 10 are also used to scan fiducial targets such as the targets 1930A, 1930B, 1930C, 1930D with the same beam 1905 used to produce the glowing pattern of light 1910. In some cases, the fiducial targets have been made of retroreflective materials, while in other cases the targets are features that are reflective but not retroreflective.

Historically, industrial light projector systems have used continuous wave (cw) lasers with on/off controls to project multi-segment glowing templates. However, the visibility of a glowing pattern of light 1910 produced by a cw laser is limited by the allowable average laser beam power. The visible brightness of projected continuous lines is proportional to the reflectivity of the object's surface and inversely related to the projected line width and the distance from the projector to the object.

A prior art reference disclosing improvement of laser projection visibility is disclosed in U.S. Pat. No. 7,385,180 to Rueb, et al., issued on Jun. 10, 2008. The suggested solution prescribes decreasing the maximum beam steering speed, resulting in a flickering image. Although such an approach increases visibility, it does so at the expense of user headaches and dizziness.

A prior art approach to improving visibility without flickering is disclosed in commonly held U.S. Pat. No. 8,085,388 to Kaufman, et al., issued on Dec. 27, 2011. This approach uses a pulsed laser, such as a Q-switched laser, having a fixed repetition rate. A beam-steering control is synchronized with the generated laser pulses to produce a projection consisting of stationary spots 1912. Although an improvement over prior art solutions, this approach could not be optimized to deliver the best possible visibility of the projected laser light for different trajectories of the projected beam while also meeting eye laser safety requirements. Another shortcoming of this approach is the need for relatively complicated and expensive signal processing.

In an embodiment, the glowing pattern of light 1910 includes dotted contours 1912 as in FIG. 19. In an embodiment, the dots 1912 appear to be stationary to the human eye though the projected trajectory is created by dynamically steering the laser beam as a periodic function of time. In an embodiment, the dots 1912 are formed by pulsed laser light having a selectable repetition rate. A beam steering control produces variable acceleration and velocity through a stream of incremental position commands precisely synchronized with the timing of the laser pulses. The frequency and duration of the laser pulses are selected based at least in part on a selected beam angular velocity that maintains a reasonable separation between the dots while maintaining a peak optical power that meets the laser eye safety limits. To implement such a collection of dots with the light projection system 10. In an embodiment, the laser 710 has modes for generating both pulsed light and cw light. In an embodiment, the pulsed laser light may rapidly change repetition rate, peak power, and pulse duration. In an embodiment, the cw laser has a variable power level. In an embodiment, the laser source is a semiconductor laser having analog functionality for modulating the laser beam in time. In an embodiment, the light projector 10 ordinarily uses the pulsed mode of operation when projecting the glowing pattern of light 1910 on the object as a collection of dots 1912. It ordinarily uses the cw mode of operation when scanning fiducial targets and features such as 1930A, 1930B, 1930C, 1930D in raster scan patterns 1932A, 1932B, 1932C, 1932D, respectively. In an embodiment, the analog section circuit 1802 (FIG. 18A) converts the detected signal from analog to digital form before sending it to the CPLD 1804 for further processing. In an embodiment, the optical detector 741 and the power monitor 1820 are used to guarantee fail-safe system operation in multiple laser control modes by limiting the average output power and, if desired, the laser pulse energy according to the assigned laser safety class.

Figure 20:
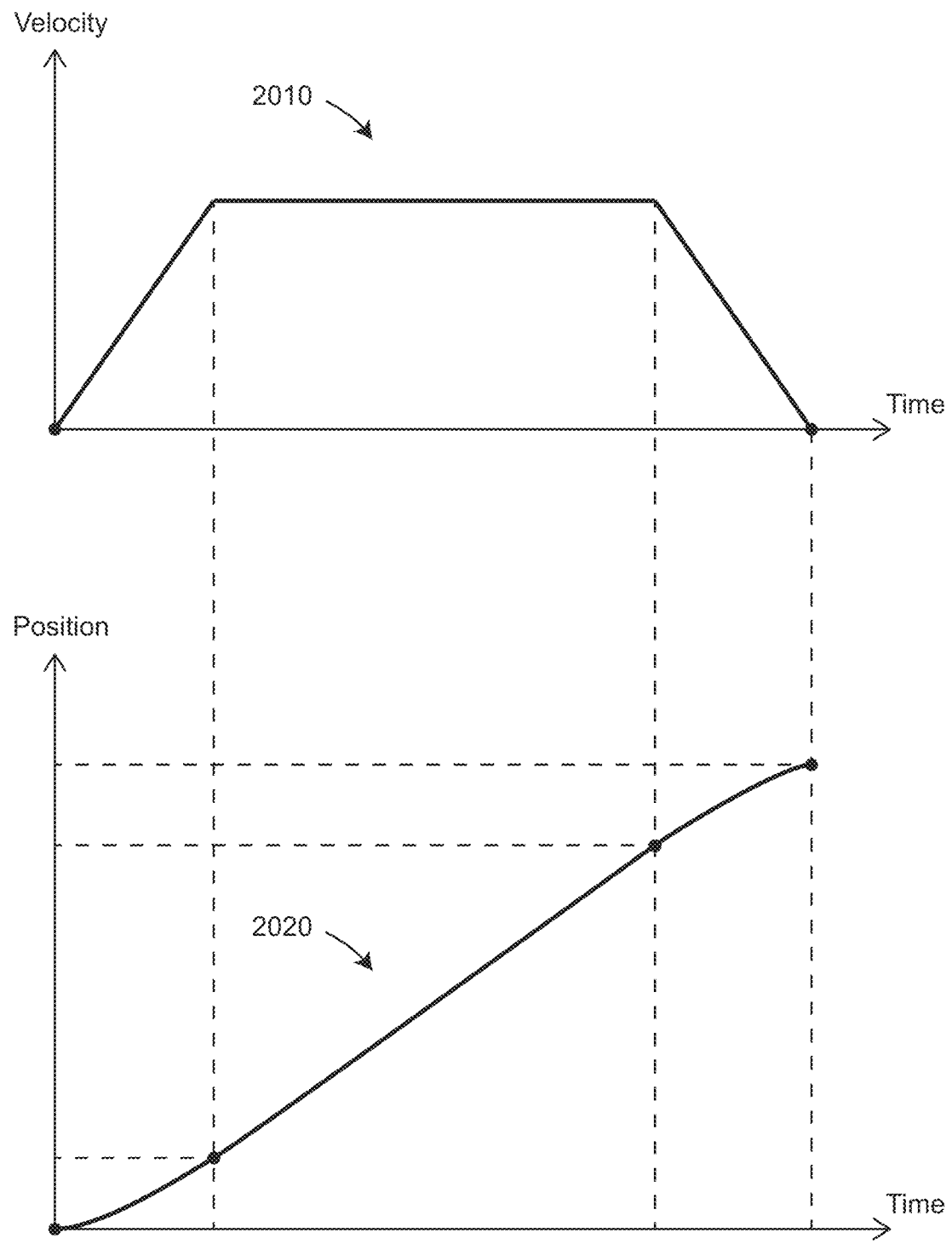
FIG. 20 is an exemplary pair of plots showing a trapezoidal velocity profile and resulting position profile according to an embodiment.
Figure 21:
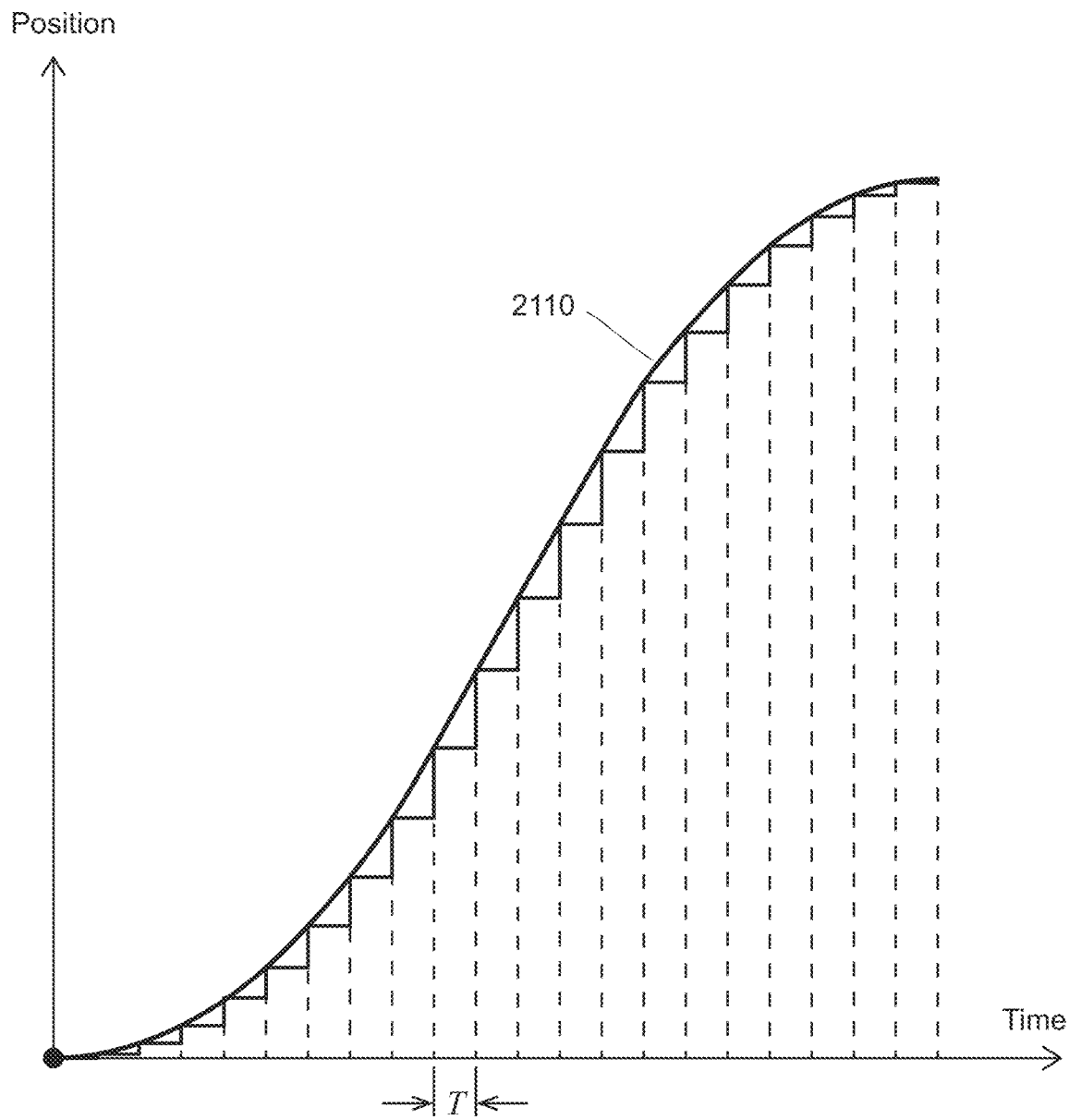
FIG. 21 is an exemplary plot showing beam steering trajectory control using free running motion control ticks according to an embodiment.

In an exemplary light projector 10, the beam steering angular velocity reaches up to about 200 radians per second, with beam steering angular accelerations reaching up to about 200,000 radians per second squared. FIG. 20 illustrates an exemplary velocity trajectory 2010 constructed of piece-wise segments. FIG. 20 also shows the resulting position trajectory 2020, which is found by integrating the velocity trajectory over time. In an embodiment, beam-steering servo control is provided by the DSP 1880 of the galvo module 1750 (FIG. 18C). In an embodiment, the DSP 1880 sends real-time position commands to the galvo motor assemblies 757, 762 at equal time intervals ("time ticks") of between 10 and 80 microseconds. Because the time intervals are much smaller than the reaction time of the galvo motor assemblies 757, 764, the position commands executed in each time interval produce a smooth motion. This is illustrated in FIG. 21, where incremental position movements at time intervals T produce a smooth position trajectory 2110.

Figure 22:
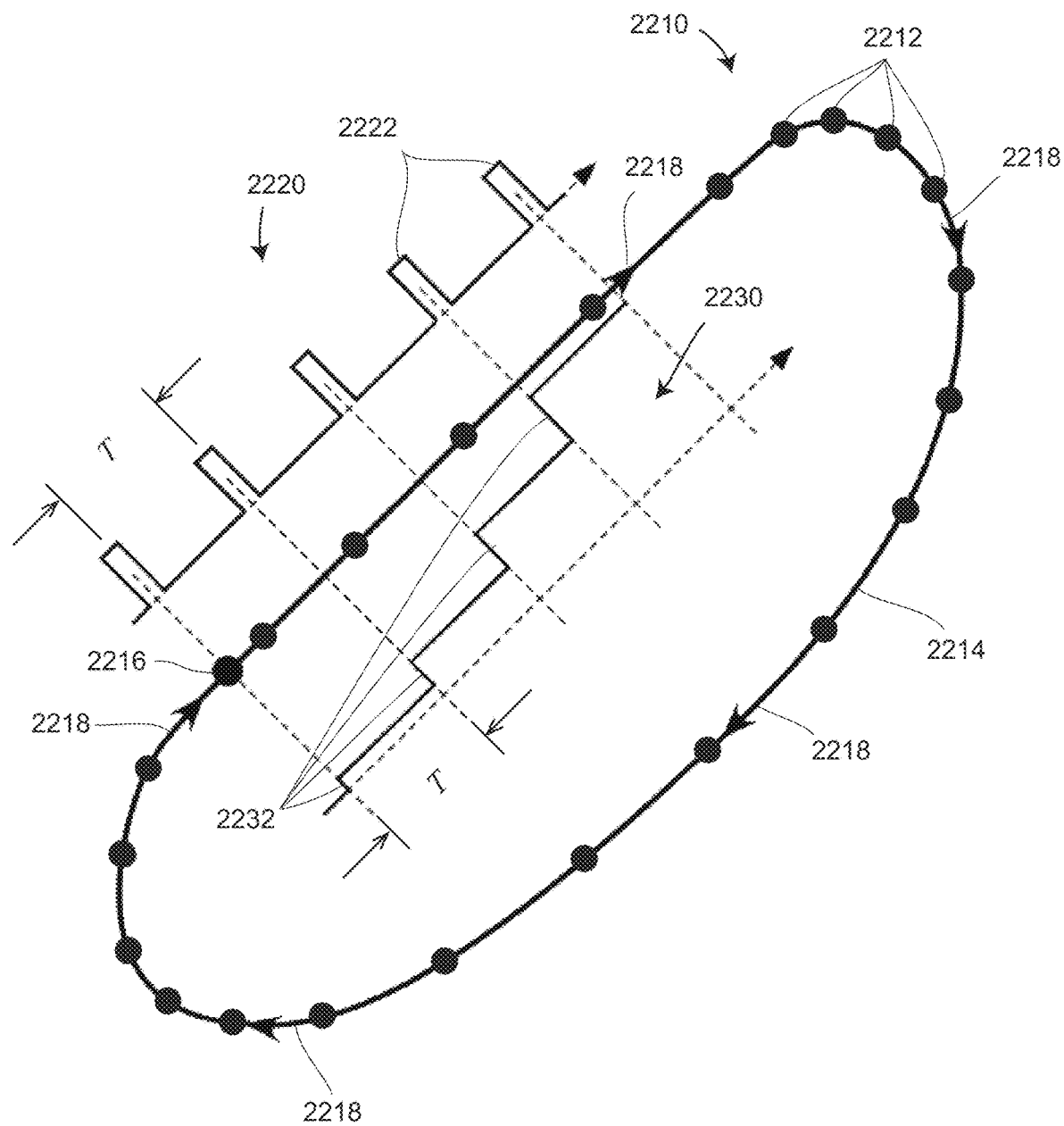
FIG. 22 is an exemplary projection pattern in which beam steering motion is synchronized with a stream of laser pulses according to an embodiment.

In an embodiment, the carrier PCBA 1845 provides a master clock that sends synchronization signals to the DSP 1880 in the galvo module 1750 and through the cables 1811, 1842 to the TEC PCBA 1731. FIG. 22 is a schematic illustration showing how galvo movements and laser emissions are synchronized to produce a glowing pattern 2210 on an object. The glowing pattern includes a collection of glowing dots 2212. A line 2214 connecting the dots is ordinarily not visible on the object. In an embodiment, a complete collection of the dots 2212 is projected once each cycle beginning with an initial projection point 2216. In an embodiment, both galvo mirrors 755, 760 are completely settled in their positions at the initial projection point 2216. The direction of movement of the projected dots during a cycle is indicated by the arrows 2218. Clock pulses 2222 of the master clock pulse train 2220 are separated by the time intervals (time ticks) T. In an embodiment, the laser beam is emitted at each time interval, with one of the dots 2212 produced with each emission. In an embodiment, the amount of separation between adjacent dots 2212 is determined by the movement of the galvo mirrors 755, 760 between laser emissions. In an embodiment, this movement is determined by signals sent from the DSP 1880 to the power amplifier 1882 in the galvo module 1750. These signals are indicative of a position trajectory 2230 in FIG. 22, also discussed herein in reference to FIG. 21. The distance between successive dots 2212 are command increment distances 2232 calculated for each interval. Because of the dynamic integration of small individual command increments resulting in a smooth, reproducible motion profile, the locations of the laser dots 2212 appear stationary to the human eye, even though the trajectory path is created by a moving pulsed laser beam. Although in the discussion herein above, the laser pulses were synchronized to command increment distances between dots 2212, a stationary pattern would still be created even if the time between laser pulses were a little different than the time between calculated position increments as long as the galvo mirrors 755, 760 came to a stop at the start of each period at the projection point 2216 beam position.

Figure 23A:
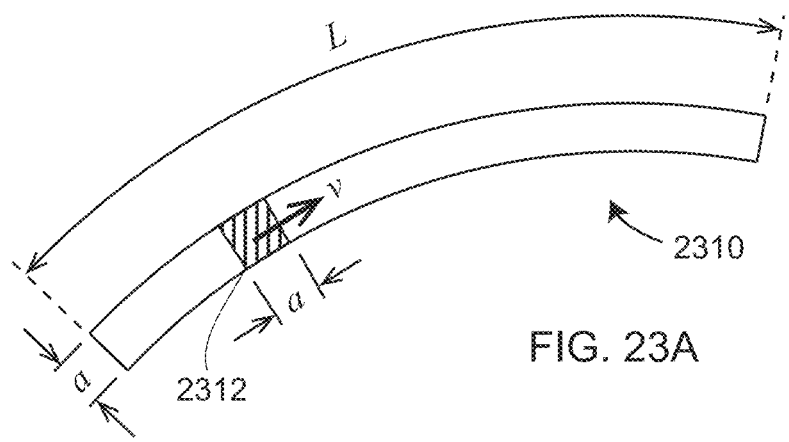
FIG. 23A is a schematic illustration of brightness of a projected laser line for a continuous wave (cw) laser beam according to an embodiment.
Figure 23B:
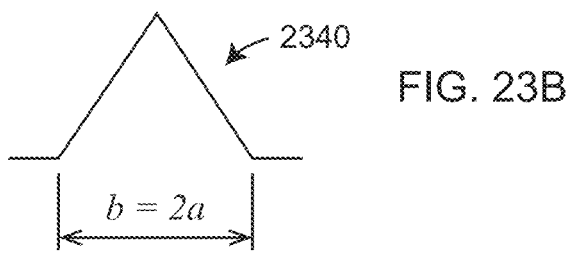
FIG. 23B is a schematic illustration of illumination distribution for a pulsed beam traveling at a constant velocity according to an embodiment.

Visibility of a glowing pattern 2210 formed by a focused moving laser beam, either continuous or pulsed, is determined by its local average irradiance, in units of optical power per unit area, along the trajectory path. This is illustrated in FIG. 23A for continuous laser operation and in FIGS. 23B, 23C, 23D for pulsed operation. To simplify calculations, the shape of the focused laser spot 2312 in FIG. 23A is a square, each side having a dimension a. For the case of cw laser operation that produces a periodically projected continuous glowing line section 2310 formed by a continuously moving laser spot 2312 having a linear velocity v, a projection refresh period T, a spot side dimension a, and a cw beam power $P_0$, the average irradiance $A_0$ of the glowing line section as seen by a viewer is $$A_0=(P_0/a^2)(a/L)=P_0/(vTa) \quad \text{(Eq. 1)}$$

Here, the length L of the periodically projected line 2310 is L=v·T. For the case of continuous laser operation, the average output power $P_A$ is equal to the cw laser power $P_0$.

Figure 23C:
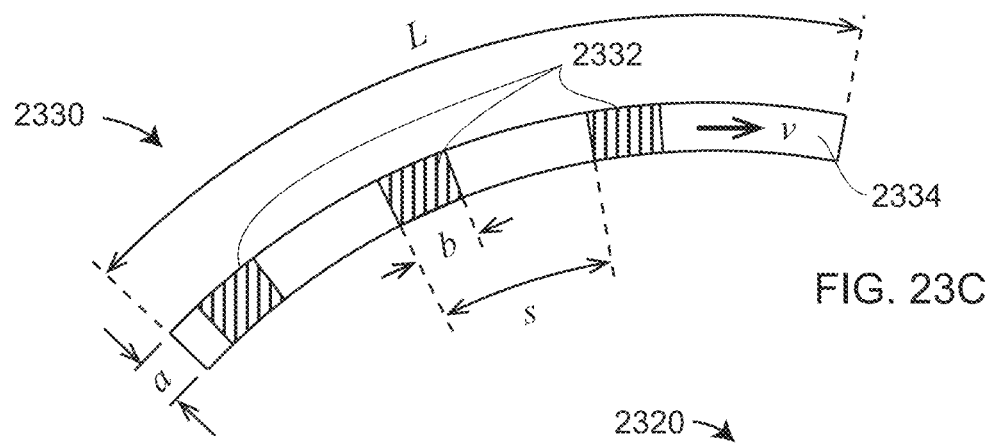
FIG. 23C is a schematic illustration of brightness of a projected laser line for a pulsed laser beam according to an embodiment.
Figure 23D:
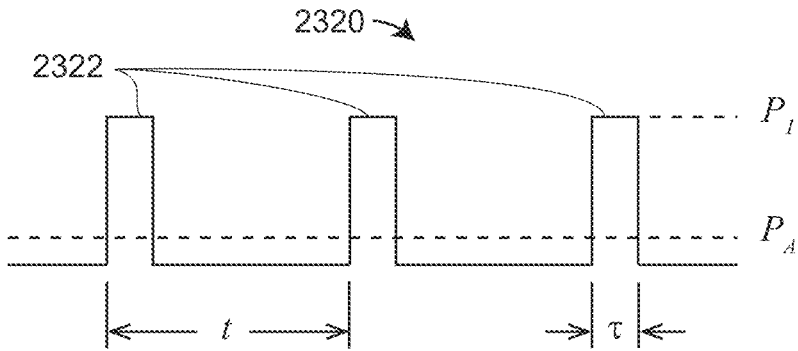
FIG. 23D is a schematic illustration of laser pulses according to an embodiment.

FIG. 23D shows a pulse train 2320 of individual laser pulses 2322 each having a pulse width τ, the time interval between pulses t, and a peak power $P_1$. The average output beam power $P_A$ of the pulse train 2320 is $$P_A=P_1\tau/t. \quad \text{(Eq. 2)}$$

FIG. 23C shows a periodically projected pattern 2330 having isolated areas 2332 illuminated during the laser pulses 2322. The projected spots are blurred over the pulse width τ by the movement of the beam at the linear velocity v. If the velocity is constant over the pulse width, then the velocity is equal to $$v=a/\tau, \quad \text{(Eq. 3)}$$

And the illumination distribution across each area 2332 has a triangular shape 2340 that occupies a length $$b=2a \quad \text{(Eq. 4)}$$

If the pulses are synchronized with the beam motion control as described herein above, the isolated areas 2332 appear to be stationary to the human eye, and the isolated areas 2332 occupy the same locations in the path 2334 for every period of projection. In this situation, the separation s between adjacent areas 2332 is $$s=t·v. \quad \text{(Eq. 5)}$$

The average irradiance $A_1$ of a single laser dot in an isolated area 2332 as it appears to a viewer eye is $$A_1=(P_1/2a^2)(a/L). \quad \text{(Eq. 6)}$$

Noting that for the case of a cw laser beam, the average output power is equal to the cw laser power, $P_A=P_0$, and combining Eqs. (1)-(6) give the results $$A_1=A_0 s/b, \quad \text{(Eq. 7)}$$

$$\text{and } s/b=t/(2\tau). \quad \text{(Eq. 8)}$$

Eq. (7) says that average irradiance of an individual laser dot in area 2332 as viewed by an observer's eye is higher by a factor s/b than the average irradiance of a continuously moving laser spot 2312 emitted by a cw laser. Hence it is possible to improve visibility using a pulsed laser beam to produce dots that appear stationary to a user. As an example, to achieve an increase in the irradiance of 5 to 10 times in a glowing pattern of light seen by an observer, the ratio s/b would ordinarily be held to at least 10:1.

The discussion above made some simplifying assumptions such as the shape of the moving laser spot (square rather than Gaussian shape, for example). If desired, more detailed calculations can be performed to eliminate the simplifying assumptions. In general, the effective spot size is a function of pulse width, linear velocity, and simplified spot size: b=F(τ,v,a).

An aspect of an embodiment is obtaining high visibility of the dots that appear stationary while keeping within laser safety requirements. This is done by adjusting a combination of parameters, including average laser power, pulse repetition rate, instant pulse energy, focused laser spot size, distance between the light projector 10 and the object, and the beam steering angular velocity.

In an embodiment, the relevant laser safety standard in most cases is the International Standard on Safety of Laser Products IEC 60825-1. This standard defines Accessible Exposure Limits (AEL) by limiting the average laser power, the single pulse energy, and the energy per pulse within a pulse train for each defined Laser Safety Class. In other embodiments, other standards or safety guidelines are followed instead of, or in addition to, those of IEC 60825-1.

For galvanometer-based laser light projectors such as the light projector 10, usually the relevant laser quantities from IEC 60825-1 are average laser power and single pulse energy. Allowable levels for these quantities are established for different laser classes. For the light projector 10, usually projectors are either class 2 or class 3R. For projection of visible wavelengths, the average optical power limits are 1 mW for class 2 and 5 mW for class 3R.

According to the 2014 edition of IEC 60825-1, the maximum single pulse energy for visible light pulses shorter than 5 microseconds is 77 nJ (nanojoules) for class 1 and class 2 and 380 nJ for class 3R.

For a single pulse energy $E_P$ and an average power $P_A$ of a pulse train, the periodicity of pulses is given by $$t = E_P/P_A. \quad \text{(Eq. 9)}$$

Hence for a class 2 laser at the optical power limit of 1 mW and a pulse energy limit of 77 nJ, the periodicity of laser pulses in a pulse train must be separated by at least H=77 nJ/1 mW=77 μs. In this document, the symbol H is used to represent the maximum allowable periodicity. Many values are possible for the allowable periodicity H according to the standard being considered.

For pulsed laser operation, a value is obtained for a maximum allowable linear spacing between projected dots. Spacing between the dots must be small enough to provide an operator with guidance to align and place items in a manufacturing or construction projector. In an embodiment, the spacing s is a constant. The light projector 10 has maximum achievable angular velocity $v_{ang}$ (in units of radians per second) for the projected beam of light. In an embodiment, the periodicity t between pulses is determined with the equation $t=s/(D \cdot v_{ANG})$. In one embodiment, D is the average distance between the light projector 10 and the object. Under this condition, the quantities s, D, and $v_{ang}$ are fixed so that the periodicity t between adjacent laser pulses is also fixed. In another embodiment, the distance D is taken to be the actual distance to each point, which then produces a periodicity t that changes with the distance D.

In an action, one of two branches is taken according to whether the periodicity t between pulses is less than or equal to the pulse train periodicity threshold H. If t≤H, then for an allowable average power limit $P_{AvLim}$ and a maximum available peak laser power $P_{PkMax}$, the pulse width τ and peak power $P_1$ are set to $$\tau = t \cdot P_{AvLim}/P_{PkMax}, \quad \text{(Eq. 10)}$$

$$P_1 = P_{PkMax}. \quad \text{(Eq. 11)}$$

If t>H, then the pulse width τ and peak power $P_1$ are set to $$\tau = (t/0.7)^{1.33}, \quad \text{(Eq. 12)}$$

$$P_1 = P_{AvLim}. \quad \text{(Eq. 13)}$$

The calculated values for the periodicity t, the pulse width τ, and the peak pulse power $P_1$ are selected to provide control of the laser when running in pulsed mode. The laser beam is steered by the galvo steering mirrors 755, 760 in response to signals sent from the DSP 1880. The trajectory produced by the galvo steering mirrors 755, 760 is synchronized to the laser pulses.

For cw laser operation, the processor calculates the trajectory of the glowing pattern. The average output power is set less than or equal to the laser safety limit: $P_{Av} \leq P_{AvLim}$. The galvo steering mirrors 755, 760 move the laser beam along a predetermined trajectory, taking steps with free running motion control ticks T as in FIG. 21.

For both pulsed and cw laser operation, the power monitor assembly 1020 monitors the output of the laser monitor to guarantee fail-safe operation of the system to meet laser safety requirements. In an embodiment, when the light projector 10 is operating in cw mode and the average emitted laser power $P_{Av}$ exceeds the laser safety limit $P_{AvLim}$, circuitry in the power monitor 1820 in the optics or front panel module 1720 causes the PSoC 1825 to send a signal to the laser driver PCBA 1732 over the control line 1841 to shut down the laser 710. In an embodiment, when the light projector 10 is operating in pulsed mode, the power monitor 1820 causes the PSoC 1825 to send a signal to the laser driver PCBA 1732 to shut down the laser if the energy of a single laser pulse energy exceeds the allowable emission limit for pulse energy for the given periodicity t, for example, as given in IEC 60825-1 or other applicable laser safety standard.

Today, it can happen that a light projector system projects so many patterns on an object that the time to project all the patterns is larger than the flicker limit, resulting in the undesirable flicker effect described earlier. A way that has been developed for countering this problem is for an operator to place a reflective or retroreflective material in the path the projected pattern. The presence of this material is detected by the light projector system and interpreted as a command by the operator. Such a command might indicate, for example, to zoom in on the region near the detected material, thereby illuminating only a portion of the whole pattern and causing the flickering to stop. In another case, the command might direct the light projector to begin projecting the next pattern in a sequence of patterns. Such a command might be used, for example, in a multi-ply layout procedure used with carbon-fiber composite structures in which a different pattern is projected for each new ply.

These methods for inserting a reflective material into the path of projected beam of light work well for projectors operating in cw mode. However, this method does not in general work for the case in which stationary dots are projected onto an object at position 2216, as the dots do not necessarily intercept the reflective material. The projection of dots is particularly problematic if the reflective pattern inserted into the projected light pattern contains multiple separate elements that together provide a coded command in which the command depends on the arrangement of the separate elements.

FIGS. 24A, 24B, 24C show three reflective coded patterns 2400, 2410, 2420, respectively, having one, two, and three reflective elements 2402, 2412, 2422, respectively, that reflect patterns of light 2404, 2414, 2424, respectively. If a cw beam of light strikes these reflective coded patterns, the pattern of reflected light is detected by optical detectors such as the SiPM detectors 1385, 1390 and the pattern identified by a processor within the light projector 10. In contrast, when the light projector is operating in the pulsed mode, as illustrated in FIG. 24D, the reflective portion 2432 of the coded pattern 2430 will not necessarily reflect light from one of the dots 2434. In an embodiment, the operator moves the target along the path 2436 until one of the reflective elements reflects one of the dots back to the light projector 10. In most cases, the reflectivity of the reflective portion of a reflective coded pattern will be relatively much larger than the amount of light reflected from the object. The processors within the light projector 10 notice this increase in reflected light and, in response, cause the light projector 10 to switch to cw mode, projecting a short segment of light 2440 over the coded pattern 2442 as illustrated in FIG. 24E. In an embodiment, the segment of light is long enough to identify the nature of the pattern within the coded pattern. In an embodiment, the light projector may return to pulsed mode or remain in cw mode depending on the nature of the coded message contained in the coded pattern.

According to another embodiment, another method is provided. The method includes: steering a pulsed laser beam to form a first pattern of stationary dots on an object; placing a reflective target to intercept one of the dots; and detecting a change in reflected light and, in response, switching the laser from pulsed mode to continuous-wave (cw) mode.

In addition to one or more of the features described herein, or as an alternative, further embodiments of the method may include detecting a second pattern of laser light reflected from the reflective target when the laser is in cw mode and, in response, taking an action based on the detected second pattern. In addition to one or more of the features described herein, or as an alternative, further embodiments of the method may include the action that steers the pulsed laser beam to form a third pattern of stationary dots on the object, the third pattern covering a smaller area than the first pattern.

According to another embodiment, another device is provided. The device including a laser operable to produce a pulsed laser beam and a continuous-wave (cw) laser beam. A beam-steering system is operable to steer the pulsed laser beam onto an object to create a first pattern of stationary dots on the object. A reflective target is provided. An optical detector is operable to detect reflected laser light. One or more processors are operable to determine that the detected laser light has been reflected by the reflective target and, in response, causing the laser to emit the cw laser beam and further causing the beam-steering system to steer the emitted cw laser beam into a segment of light on the reflective target In addition to one or more of the features described herein, or as an alternative, further embodiments of the device may include the one or more processors being operable to determine that the cw laser beam, when reflected from the reflective target and detected by the optical detector, has a second pattern, the processor taking a further action based on the determined second pattern. In addition to one or more of the features described herein, or as an alternative, further embodiments of the device may include the further action that steers the pulsed laser beam to form a third pattern of stationary dots on the object, the third pattern covering a smaller area than the first pattern.

According to another embodiment, another device is provided. The device includes a beam-steering system operable to project a pattern of laser light onto an object, the beam-steering system including a first galvanometer operable to rotate a first mirror and a second galvanometer operable to rotate a second mirror, the first galvanometer further including a first angle transducer to measure a first angle of rotation of the first mirror, the second galvanometer including a second angle transducer to measure a second angle of rotation of the second mirror. An optical detector is operable to detect laser light reflected the object. A processor is operable to discern features of the object based at least in part on the optical power of the reflected laser light and on the measured first angle and the measured second angle. A first battery is operable to automatically provide electrical power to the device in the absence of electrical power from a power mains.

In addition to one or more of the features described herein, or as an alternative, further embodiments of the device may include a second battery operable to provide electrical power to the device, wherein the first battery or the second battery may be removed from or placed into the device without first turning off power to the device. In addition to one or more of the features described herein, or as an alternative, further embodiments of the device may include a supplemental backup battery providing temporary backup power to preserve device state information when electrical power is available from neither the battery nor the power mains. In addition to one or more of the features described herein, or as an alternative, further embodiments of the device may include circuitry to balance electrical power extracted from the first battery and the second battery based at least in part on charge remaining in the first battery and the second battery.

According to another embodiment, another method is provided. The method includes: providing a system having a laser, a beam-steering system, an optical detector, and a first battery; generating laser light with the laser; projecting the laser light onto an object with the beam-steering system, the beam-steering system having a first galvanometer and a second galvanometer, the first galvanometer steering laser light off a first mirror and measuring a first angle of rotation of the first mirror, the second galvanometer steering the laser light off a second mirror and measuring a second angle of rotation of the second mirror; detecting with the optical detector the laser light reflected from the object; discerning features of the object based at least in part on the optical power of the detected laser light and on the measured first and the measured second angle; monitoring to determine whether the system is being provided with electrical power through a power mains; and providing the system with electrical power the first battery when monitoring has determined that the power mains is not providing the system with electrical power.

In addition to one or more of the features described herein, or as an alternative, further embodiments of the method may include providing the electrical system with a second battery and providing the system with electrical power from the second battery. In addition to one or more of the features described herein, or as an alternative, further embodiments of the method may include adding the second battery to the system or removing the second battery from the system without first turning off power to the system. In addition to one or more of the features described herein, or as an alternative, further embodiments of the method may include providing the system with a supplemental backup battery; monitoring to determine whether the system is being electrical power from any source; and providing the system with temporary backup power to preserve device state information when electrical power is not being provided to the system from any source.

In addition to one or more of the features described herein, or as an alternative, further embodiments of the method may include balancing electrical power extracted from the first battery and the second battery based at least in part on charge remaining in the first battery and the second battery.

In another embodiment, another device is provided. The device includes a beam-steering system operable to project a pattern of laser light onto an object, the beam-steering system including a first galvanometer operable to rotate a first mirror and a second galvanometer operable to rotate a second mirror, the first galvanometer further including a first angle transducer to measure a first angle of rotation of the first mirror, the second galvanometer including a second angle transducer to measure a second angle of rotation of the second mirror. An optical detector is operable to detect laser light reflected the object. A processor is operable to discern features of the object based at least in part on the optical power of the reflected laser light and on the measured first angle and the measured second angle. A wireless communication system is operable to transmit and receive wireless data.

In addition to one or more of the features described herein, or as an alternative, further embodiments of the device may include the wireless communication system includes a Wi-Fi transceiver module based on the IEEE 802.11 family of standards, the Wi-Fi module operable to transmit and receive data wirelessly. In addition to one or more of the features described herein, or as an alternative, further embodiments of the device may include the Wi-Fi transceiver module being operable to communicate with Wi-Fi device connected to a network. In addition to one or more of the features described herein, or as an alternative, further embodiments of the device may include the Wi-Fi transceiver module is further operable to communicate with a Wi-Fi device not connected to a network, the communication made through an access point on the device. In addition to one or more of the features described herein, or as an alternative, further embodiments of the device may include the wireless communication system having a Bluetooth transceiver module operable to exchange data wirelessly with a Bluetooth enabled device.

According to another embodiment, another device is provided. The device includes a beam-steering system operable to project a pattern of laser light onto an object, the beam-steering system including a first galvanometer operable to rotate a first mirror and a second galvanometer operable to rotate a second mirror, the first galvanometer further including a first angle transducer to measure a first angle of rotation of the first mirror, the second galvanometer including a second angle transducer to measure a second angle of rotation of the second mirror. A first optical detector is operable to detect laser light reflected the object. A second optical detector is operable to detect the laser light reflected from the object, the second optical detector having a higher sensitivity than the first optical detector. A beam splitter is operable to send a first portion of the laser light reflected from the object to the first optical detector and to send a second portion of the laser light reflected from the object to the second optical detector. A processor is operable to discern features of the object based at least in part on the measured first angle, the measured second angle, and on at least one of the optical power of the first portion and the optical power of the second portion.

In addition to one or more of the features described herein, or as an alternative, further embodiments of the device may include the sensitivity of the second optical detector is at least one hundred times higher than the sensitivity of the first optical detector. In addition to one or more of the features described herein, or as an alternative, further embodiments of the device may include a pinhole aperture; a lens operable to focus the laser light reflected from the object; and a pinhole adjustment mechanism operable to adjust the position of the pinhole aperture to pass the focused laser light to the beam splitter. In addition to one or more of the features described herein, or as an alternative, further embodiments of the device may include a housing to hold the lens and the pinhole aperture, the housing being at least partially covered with a coating to suppress scattering of light between the lens and the pinhole aperture.

According to yet another embodiment, a pinhole assembly is provided. The pinhole assembly including a pinhole aperture. A pinhole x-y adjustment mechanism is provided having a first screw and a first spring that each push in the x direction against the pinhole aperture, the first spring arranged to apply a force opposing the push of the first screw, the pinhole x-y adjustment further having a second screw and a second spring that each push in the y direction against the pinhole aperture, the second spring arranged to apply a force opposing the push of the second screw. A pinhole z-adjustment mechanism is provided having a tube with external threads, a ring with internal threads, and a third spring, the ring being placed over the pinhole x-y adjustment mechanism and the third spring and then screwed onto the tube, the ring constraining the z-position of the pinhole x-y adjustment mechanism while providing access to the first screw and the second screw for adjusting the x-y position of the pinhole aperture.

The term "about" is intended to include the degree of error associated with measurement of the quantity based upon the equipment available at the time of filing the application. For example, "about" can include a range of ±8% or 5%, or 2% of a given value.

The terminology used herein is for the purpose of describing embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not limited by the foregoing description but only by the scope of the appended claims.

What is claimed is:

1. A method comprising:
steering a pulsed laser beam to form a pattern of stationary dots on an object, the pulsed laser beam having a periodicity determined based at least in part on a maximum allowable spacing of the pattern of stationary dots and on a maximum angular velocity at which the pulsed laser beam can be steered, wherein a pulse width of the pulsed laser beam and a pulse peak power of the pulsed laser beam are based at least in part on the determined periodicity and on laser safety requirements;
storing the periodicity;
measuring a brightness of a reflected light of the pulsed laser beam with an optical detector;
detecting an increase in the brightness; and
switching a laser device from pulsed mode to continuous-wave (cw) mode.

2. The method of claim 1, further comprising steering a continuous-wave (cw) laser beam to form a pattern on the object, a power of the emitted laser beam based at least in part on the laser safety requirements.

3. The method of claim 2, further comprising shutting off projection of laser light in response to detecting with the optical detector a condition indicating that the emitted average laser power has exceeded a laser safety limit.

4. The method of claim 1, further comprising shutting off projection of laser light in response to detecting with the optical detector a condition indicating that the emitted laser pulse energy has exceeded a laser safety limit.

5. A method comprising:

steering a pulsed laser beam to form a pattern of stationary dots on an object, the pulsed laser beam having a periodicity determined based at least in part on a maximum allowable spacing of the pattern of stationary dots and on a maximum angular velocity at which the pulsed laser beam can be steered, wherein a pulse width of the pulsed laser beam and a pulse peak power of the pulsed laser beam are based at least in part on the determined periodicity and on laser safety requirements;

storing the periodicity;

placing a reflective target to intercept one of the pattern of stationary dots; and detecting a change in reflected light and, in response, switching a laser device from pulsed mode to continuous-wave (cw) mode.

6. The method of claim 5, further comprising detecting a second pattern of laser light reflected from the reflective target when the laser device is in cw mode and, in response, taking an action based on the detected second pattern.

7. A device comprising:

a laser operable to produce a pulsed laser beam;

a beam-steering system operable to steer the pulsed laser beam onto an object;

an optical detector; and one or more processors operable to control the laser, the beam-steering system and the optical detector to form the pulsed laser beam into a pattern of stationary dots on the object, the pulsed laser beam having a periodicity determined based at least in part on a maximum allowable spacing of the pattern of stationary dots and on a maximum angular velocity at which the pulsed laser beam can be steered, the pulsed laser beam having a pulse width and a pulse peak power of the pulsed laser beam determined based at least in part on the determined periodicity and on laser safety requirements;

wherein the one or more processors are further operable to measure a reflected light with the optical detector and switching the laser from pulsed mode to continuous-wave (cw) mode in response to increase in brightness in the reflected light.

8. The device of claim 7, wherein:

the laser is further operable to produce a cw laser beam having an emitted power, the emitted power based at least in part on the laser safety requirements; and the beam-steering system is further operable to steer the cw laser beam onto the object to form a first pattern on the object.

9. The device of claim 8, wherein the one or more processors are further operable to shut off the projection of laser light in response to detecting with the optical detector a condition indicating that the emitted average laser power has exceeded a laser safety limit.

10. The device of claim 9, wherein the one or more processors are further operable to steer the pulsed laser beam to form a second pattern of stationary dots on the object, the second pattern covering a smaller area than the first pattern.

11. The device of claim 7, wherein the one or more processors are further operable to shut off the projection of laser light in response to detecting with the optical detector a condition indicating that the emitted laser pulse energy has exceeded a laser safety limit.

12. The device of claim 7, further comprising:

a reflective target; and an optical detector operable to detect reflected laser light.

13. The device of claim 12, wherein:

the laser is further operable to produce a continuous wave (cw) cw laser beam;

the beam-steering system is further operable to steer the cw laser beam onto the object to form a first pattern on the object; and the one or more processors are further operable to determine that laser light detected by the optical detector has been reflected by the reflective target and, in response, causing the laser to emit the cw laser beam and further causing the beam-steering system to steer the emitted cw laser beam into a segment of light on the reflective target.

14. The device of claim 13, wherein the one or more processors are further operable to determine that the cw laser beam, when reflected from the reflective target and detected by the optical detector, has a second pattern, the one or more processors taking a further action based on the determined second pattern.

15. The device of claim 14, wherein the further action includes steering the pulsed laser beam to form a third pattern of stationary dots on the object, the third pattern covering a smaller area than the first pattern.

* * * * *